United States Patent
Wu et al.

(10) Patent No.: US 9,521,366 B2
(45) Date of Patent: Dec. 13, 2016

(54) METHOD AND APPARATUS FOR PLAYING CONFERENCE SIGNAL, VIDEO CONFERENCE TERMINAL, AND MOBILE DEVICE

(71) Applicant: Huawei Technologies Co., Ltd., Shenzhen (CN)

(72) Inventors: Jiaoli Wu, Shenzhen (CN); Chao Ma, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/946,171

(22) Filed: Nov. 19, 2015

(65) Prior Publication Data

US 2016/0080693 A1    Mar. 17, 2016

Related U.S. Application Data

(63) Continuation of application No. PCT/CN2013/084889, filed on Oct. 9, 2013.

(30) Foreign Application Priority Data

May 23, 2013  (CN) .......................... 2013 1 0196738

(51) Int. Cl.
  *H04N 7/15*  (2006.01)
  *H04L 29/06*  (2006.01)
  *H04L 12/18*  (2006.01)

(52) U.S. Cl.
  CPC ............ *H04N 7/15* (2013.01); *H04L 12/1818* (2013.01); *H04L 65/1069* (2013.01); *H04L 65/1089* (2013.01); *H04L 65/403* (2013.01)

(58) Field of Classification Search
  None
  See application file for complete search history.

(56) References Cited

U.S. PATENT DOCUMENTS 8,890,923 B2 *  11/2014  Tian ...................... H04N 7/152
                                                                348/14.03
2011/0050842 A1  3/2011  Saleh et al.
(Continued)

FOREIGN PATENT DOCUMENTS

CN        101094382 A     12/2007
CN        102118602 A      7/2011
(Continued)

OTHER PUBLICATIONS

Partial English Translation and Abstract of Chinese Patent Application No. CN102307294, Feb. 25, 2016, 16 pages.
(Continued)

*Primary Examiner* — Creighton Smith
(74) *Attorney, Agent, or Firm* — Conley Rose, P.C.

(57) ABSTRACT

A method for playing a conference signal, a video conference terminal, and a mobile device, related to the field of communications technologies, are provided to improve effects of displaying a main stream signal and a presentation stream signal. The method includes establishing a connection channel between a mobile device held by a conference participant and a video conference terminal that are at a site; sending, through the established connection channel, a first type signal in to-be-played signals to the mobile device for play, where the to-be-played signals are signals that are received by the video conference terminal and are to be played; and sending a second type signal in the to-be-played signals to a primary playing device of the site for play.

20 Claims, 12 Drawing Sheets

(56) References Cited

U.S. PATENT DOCUMENTS

| | | | |
|---|---|---|---|
| 2012/0274727 A1 | 11/2012 | Robinson et al. | |
| 2013/0106978 A1 | 5/2013 | Lam et al. | |
| 2014/0056172 A1* | 2/2014 | Lee | H04W 76/02 370/254 |
| 2014/0092259 A1* | 4/2014 | Tsang | G06F 1/1632 348/207.1 |
| 2014/0273859 A1* | 9/2014 | Luna | H04W 4/008 455/41.3 |
| 2014/0279889 A1* | 9/2014 | Luna | G06F 17/30575 707/626 |
| 2015/0042748 A1* | 2/2015 | Tian | H04N 7/152 348/14.07 |

FOREIGN PATENT DOCUMENTS

| | | |
|---|---|---|
| CN | 202004894 U | 10/2011 |
| CN | 102307294 A | 1/2012 |
| CN | 202103784 U | 1/2012 |
| CN | 102883134 A | 1/2013 |
| CN | 103327287 A | 9/2013 |

OTHER PUBLICATIONS

Partial English Translation and Abstract of Chinese Patent Application No. CN202004894, Feb. 25, 2016, 7 pages.
Partial English Translation and Abstract of Chinese Patent Application No. CN101094382, Nov. 17, 2015, 7 pages.
Partial English Translation and Abstract of Chinese Patent Application No. CN202103784, Nov. 17, 2015, 7 pages.
Partial English Translation and Abstract of Chinese Patent Application No. CN103327287, Part 1, Feb. 25, 2016, 14 pages.
Partial English Translation and Abstract of Chinese Patent Application No. CN103327287, Part 2, Feb. 25, 2016, 4 pages.
"Series G: Transmission Systems and Media, Digital Systems and Networks, Digital terminal equipments—Coding of voice and audio signals, Pulse code modulation (PCM) of voice frequencies, Amendment 2: New Appendix III—Audio quality enhancement toolbox," ITU-T, G.711, Amendment 2, Nov. 2009, 16 pages.
"Series H: Audiovisual and Multimedia Systems, Infrastructure of audiovisual services—Coding of moving video, Advanced video coding for generic audiovisual services," ITU-T, H.264, Apr. 2013, 732 pages.
"Series H: Audiovisual and Multimedia Systems, Infrastructure of audiovisual services—Systems and terminal equipment for audiovisual services, Packed-based multimedia communications systems, Amendment 1: Use of Facility message to enable call transfer," ITU-T, H.323, Amendment 1, Mar. 2013, 8 pages.
"Series H: Audiovisual and Multimedia Systems, Infrastructure of audiovisual services—Communication procedures, Implementors Guide for Recommendations of H.320 System ("Narrow-band visual telephone systems and terminal equipment"): H.320, H.221, H.224, H230, H.242, H.243," ITU-T, H.320 System Implementors' Guide, Nov. 26, 2004, 9 pages.
Rosenberg, J., et al., "SIP: Session Initiation Protocol," RFC 3261, Jun. 2002, 269 pages.
Foreign Communication From a Counterpart Application, PCT Application No. PCT/CN2013/084889, English Translation of International Search Report dated Feb. 27, 2014, 3 pages.
Foreign Communication From A Counterpart Application, PCT Application No. PCT/CN2013/084889, English Translation of Written Opinion dated Feb. 27, 2014, 10 pages.
Foreign Communication From A Counterpart Application, Chinese Application No. 201310196738.5, Chinese Office Action dated Nov. 3, 2015, 9 pages.

* cited by examiner

CONT. FROM
FIG. 7A

A PAD2 sends, according to the classification information of the to-be-played signals, a switching play request message for requesting to switch the main stream signal currently played on the large screen at the site to the presentation stream signal — 709

Control the VCT to receive the switching play request message sent by the PAD2, and send the switching play request message to the master PAD1, to instruct the master PAD1 to determine whether to approve information requested by the switching play request message — 710

711
According to a switching instruction sent by the master PAD1, determine whether the master PAD1 approves the information requested by the switching play request message Yes ↓ 712  No ↓ 713

Control the VCT to send, according to the switching play request message, the first subtype signal of the presentation stream signal to the large screen at the site, to instruct the large screen to stop playing the main stream signal, and start to play the first subtype signal of the presentation stream signal; and control the VCT to send, according to the third item of the first switching policy, the main stream signal to each PAD at the site, to instruct each PAD to stop playing the first subtype signal of the presentation stream signal, and start to play the main stream signal Control the VCT to send, according to the switching instruction sent by the master PAD1, to the PAD2 that sends the switching play request message, a message of not agreeing to switch

FIG. 7B

METHOD AND APPARATUS FOR PLAYING CONFERENCE SIGNAL, VIDEO CONFERENCE TERMINAL, AND MOBILE DEVICE

CROSS-REFERENCE TO RELATED APPLICATION

This application is a continuation of International Application No. PCT/CN2013/084889, filed on Oct. 9, 2013, which claims priority to Chinese Patent Application No. 201310196738.5, filed on May 23, 2013, both of which are hereby incorporated by reference in their entireties.

TECHNICAL FIELD

The present disclosure relates to the field of communications technologies, and in particular, to a method and an apparatus for playing a conference signal, a video conference terminal, and a mobile device.

BACKGROUND

A videoconferencing service is a multimedia service that combines information such as speech, images, and data for long-distance transmission. At present, a widely used videoconferencing service is a video conference (VC), where the VC refers to a communications manner in which audio and video communications technologies and devices are used to hold a conference between two locations or among multiple locations by using transmission channels. As shown in FIG. 1, at present, a video conference system generally includes at least two video conference terminal subsystems, a transmission channel, and a multipoint control unit (MCU). As shown in FIG. 2, a video conference terminal subsystem located at each site includes a video conference terminal (VCT), a video input device (for example, a camera or a camera array) for collecting a video signal or an image signal, an audio input device (for example, a microphone or a microphone array), an audio output device (for example, a loudspeaker or a loudspeaker array) for playing a received audio signal, and a display device (for example, a display or a projector) for displaying a received video (or image) signal.

At present, a VCT located at a site is used to send a request message generated at this site to an MCU through a transmission channel corresponding to the VCT, and receive a control instruction from the MCU through the transmission channel corresponding to the VCT. The VCT is further used to compress and encode a main stream signal and a presentation stream signal of this site that are collected by a camera or a microphone, and multiplex the compressed and encoded signals and send the multiplexed signals to the MCU through the corresponding transmission channel. A main stream signal is a signal of a site corresponding to a conference location that is collected in real time, for example, an image signal, a speech signal, or a video signal that is collected in real time. A presentation stream signal is another signal except the main stream signal of the site corresponding to the conference location, for example, a shared video signal or a data signal corresponding to a shared document. The MCU performs processing such as mixing and adaptation on the received signals, and sends the processed signals to another VCT through a transmission channel corresponding to the other VCT, where the other VCT is a VCT except the VCT among VCTs managed by the MCU. In addition, the VCT is further configured to classify, decompress, and decode the signals that are received from the MCU through the transmission channel corresponding to the VCT, to obtain the decoded main stream signal and the decoded presentation stream signal, and control the decoded main stream signal and the decoded presentation stream signal to be displayed on a display device of the site in a picture in picture (PIP) manner, that is, to display the main stream signal in full screen, and display the presentation stream signal in an inset window, or display the presentation stream signal in full screen, and display the main stream signal in an inset window.

At present, a size of a signal displayed in an inset window is relatively small, and a signal that is displayed in an inset window blocks a part of a signal that is displayed in full screen, which leads to relatively undesirable effects of displaying the main stream signal and the presentation stream signal.

In conclusion, at present, a VCT controls a restored main stream signal and a restored presentation stream signal to be displayed on a display device of a site corresponding to a conference location in a PIP manner, which leads to relatively undesirable effects of displaying the main stream signal and the presentation stream signal.

SUMMARY

The present disclosure provides a method and an apparatus for playing a conference signal, a video conference terminal, and a mobile device, to improve effects of displaying a main stream signal and a presentation stream signal.

According to a first aspect, a method for playing a conference signal is provided, where the method includes establishing a connection channel between a mobile device held by a conference participant and a video conference terminal that are at a site; sending, through the established connection channel, a first type signal in to-be-played signals to the mobile device for play, where the to-be-played signals are signals that are received by the video conference terminal and are to be played; and sending a second type signal in the to-be-played signals to a primary playing device of the site for play, wherein the to-be-played signals, the first type signal is a presentation stream signal, and the second type signal is a main stream signal, or the first type signal is a main stream signal, and the second type signal is a presentation stream signal.

With reference to the first aspect, in a first possible implementation manner, before the sending a first type signal in to-be-played signals to the mobile device, the method further includes sending classification information of the to-be-played signals to the mobile device, to instruct the mobile device to determine, according to the classification information of the to-be-played signals, a play request message including information about a signal requested to be played by the mobile device; the sending a first type signal in to-be-played signals to the mobile device includes sending, to the mobile device according to the play request message received from the mobile device, the first type signal that is in the to-be-played signals and is requested to be played by the mobile device.

With reference to the first aspect, in a second possible implementation manner, the first type signal includes different subtype signals; the sending a first type signal to the mobile device for play includes sending information about the different subtype signals included in the first type signal to the mobile device; receiving information about a subtype signal requested to be played that is sent by the mobile device according to the information about the different subtype signals; and sending the subtype signal that is requested to be played by the mobile device and included in the subtype signals to the mobile device that sends the information about the subtype signal requested to be played for play, or to all mobile devices at the site for play.

According to a second aspect, a method for playing a conference signal is provided, where the method includes establishing a connection channel between a mobile device held by a conference participant and a video conference terminal that are at a site; receiving, through the established connection channel, a type of signal that is sent by the video conference terminal and selected from to-be-played signals including two different types of signals; and playing the received type of signal, where the type of signal is a presentation stream signal or a main stream signal.

With reference to the second aspect, in a first possible implementation manner, before the receiving a type of signal that is sent by the video conference terminal and selected from to-be-played signals, the method further includes receiving, through the established connection channel, classification information of the to-be-played signals that is sent by the video conference terminal, and determining, according to the received classification information, information about a signal requested to be played; and sending a play request message including the determined information about the signal to the video conference terminal; the receiving a type of signal that is sent by the video conference terminal and selected from to-be-played signals includes receiving, through the established connection channel, a type of signal that is selected by the video conference terminal according to the information about the signal included in the play request message, from the to-be-played signals including two different types of signals.

With reference to the second aspect, in a second possible implementation manner, the type of signal includes different subtype signals; the receiving a type of signal sent by the video conference terminal includes receiving, through the connection channel, information about the different subtype signals included in the type of signal, where the information is sent by the video conference terminal; sending, to the video conference terminal through the connection channel according to the received information about the different subtype signals included in the type of signal, information about a subtype signal requested to be played; and receiving, through the connection channel, the subtype signal selected by the video conference terminal according to the information about the subtype signal requested to be played, from the different subtype signals included in the type of signal in the to-be-played signals.

According to a third aspect, an apparatus for playing a conference signal is provided, where the apparatus includes a connecting unit configured to establish a connection channel between a mobile device held by a conference participant and a video conference terminal that are at a site; a first sending unit configured to send, through the connection channel established by the connecting unit, a first type signal in to-be-played signals to the mobile device for play, where the to-be-played signals are signals that are received by the video conference terminal and are to be played; and a second sending unit configured to send a second type signal in the to-be-played signals to a primary playing device of the site for play, where in the to-be-played signals, the first type signal is a presentation stream signal, and the second type signal is a main stream signal, or the first type signal is a main stream signal, and the second type signal is a presentation stream signal.

With reference to the third aspect, in a first possible implementation manner, the apparatus for playing a conference signal further includes a third sending unit configured to, before the first sending unit sends the first type signal in the to-be-played signals to the mobile device, send classification information of the to-be-played signals to the mobile device, to instruct the mobile device to determine, according to the classification information of the to-be-played signals, a play request message including information about a signal requested to be played by the mobile device; the first sending unit is configured to send, to the mobile device according to the play request message received from the mobile device, the first type signal that is in the to-be-played signals and is requested to be played by the mobile device for play.

According to a fourth aspect, an apparatus for playing a conference signal is provided, where the apparatus includes a connecting unit configured to establish a connection channel between a mobile device held by a conference participant and a video conference terminal that are at a site; a receiving unit configured to receive, through the connection channel established by the connecting unit, a type of signal that is sent by the video conference terminal and selected from to-be-played signals including two different types of signals; and a play unit configured to play the type of signal received by the receiving unit, where the type of signal is a presentation stream signal or a main stream signal.

With reference to the fourth aspect, in a first possible implementation manner, the apparatus for playing a conference signal further includes a processing unit configured to, before the receiving unit receives the type of signal that is sent by the video conference terminal and selected from the to-be-played signals, receive, through the connection channel established by the connecting unit, classification information of the to-be-played signals that is sent by the video conference terminal, and determine, according to the received classification information, information about a signal requested to be played; and send a play request message including the determined information about the signal to the video conference terminal; the receiving unit is configured to receive, through the established connection channel, a type of signal that is selected by the video conference terminal according to the information about the signal included in the play request message, from the to-be-played signals including two different types of signals.

According to a fifth aspect, a video conference terminal is provided, where the terminal includes a processor configured to establish a connection channel between a mobile device held by a conference participant and the video conference terminal that are at a site; and a signal distributor configured to send, through the connection channel established by the processor, a first type signal in to-be-played signals to the mobile device for play, where the to-be-played signals are signals that are received by the video conference terminal and are to be played; and send a second type signal in the to-be-played signals to a primary playing device of the site for play, where in the to-be-played signals, the first type signal is a presentation stream signal, and the second type signal is a main stream signal, or the first type signal is a main stream signal, and the second type signal is a presentation stream signal.

According to a sixth aspect, a mobile device is provided, where the device includes a processor configured to establish a connection channel between the mobile device and a video conference terminal that are at a site; a signal receiver configured to receive, through the connection channel established by the processor, a type of signal that is sent by the video conference terminal and selected from to-be-played signals including two different types of signals; and a player configured to play the received type of signal, where the type of signal is a presentation stream signal or a main stream signal.

According to the method for playing a conference signal provided by the first aspect or the second aspect, the apparatus for playing a conference signal provided by the third aspect or the fourth aspect, the video conference terminal provided by the fifth aspect, and the mobile device provided by the sixth aspect, in the present disclosure, in consideration of that an enterprise allows an employee to carry a smart mobile device, a mobile device held by a conference participant at a site is controlled to play a first type signal in to-be-played signals, and a second type signal in the to-be-played signals is controlled to be played on a primary playing device of the site. Therefore, on the premise of increasing no device cost, a main stream signal and a presentation stream signal are prevented from being displayed in a PIP manner, thereby improving effects of playing the main stream signal and the presentation stream signal, and further improving conference experience of the conference participant and improving conference efficiency.

BRIEF DESCRIPTION OF DRAWINGS

FIG. 7A and FIG. 7B are a detailed schematic flowchart of a method for playing a conference signal according to an embodiment of the present disclosure;

DESCRIPTION OF EMBODIMENTS

In the embodiments of the present disclosure, a connection channel between a mobile device held by a conference participant and a video conference terminal that are at a site is established, a first type signal in to-be-played signals is sent to the mobile device for play through the established connection channel, where the to-be-played signals are signals that are received by the video conference terminal and are to be played; and a second type signal in the to-be-played signals is sent to a primary playing device of the site for play. The mobile device held by the conference participant at the site is controlled to play the first type signal in the to-be-played signals, and the second type signal in the to-be-played signals is controlled to be played on the primary playing device of the site. Therefore, on the premise of increasing no device cost, a main stream signal and a presentation stream signal are prevented from being displayed in a PIP manner, thereby improving effects of playing the main stream signal and the presentation stream signal.

The embodiments of the present disclosure are further described in detail below with reference to the accompanying drawings of this specification.

1. A method for playing a conference signal in this embodiment of the present disclosure is introduced in detail from the side of a video conference terminal.

Figure 1:
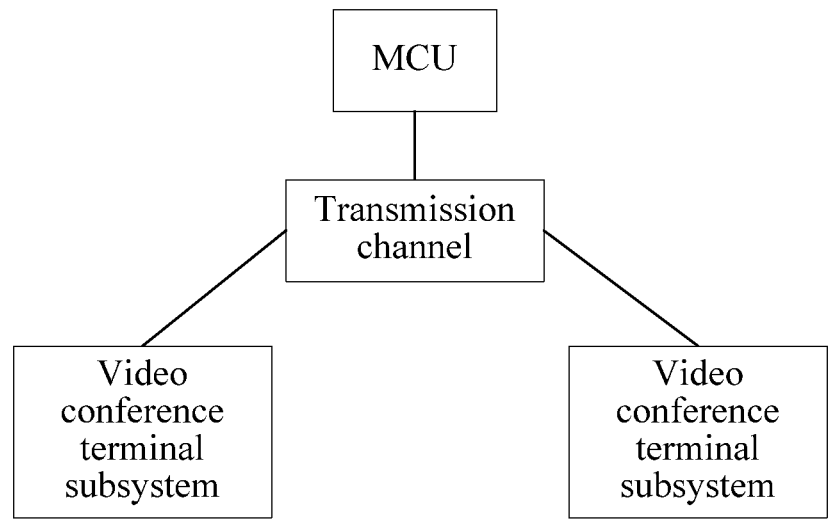
FIG. 1 is a schematic structural diagram of a video conference system in the prior art.
Figure 2:
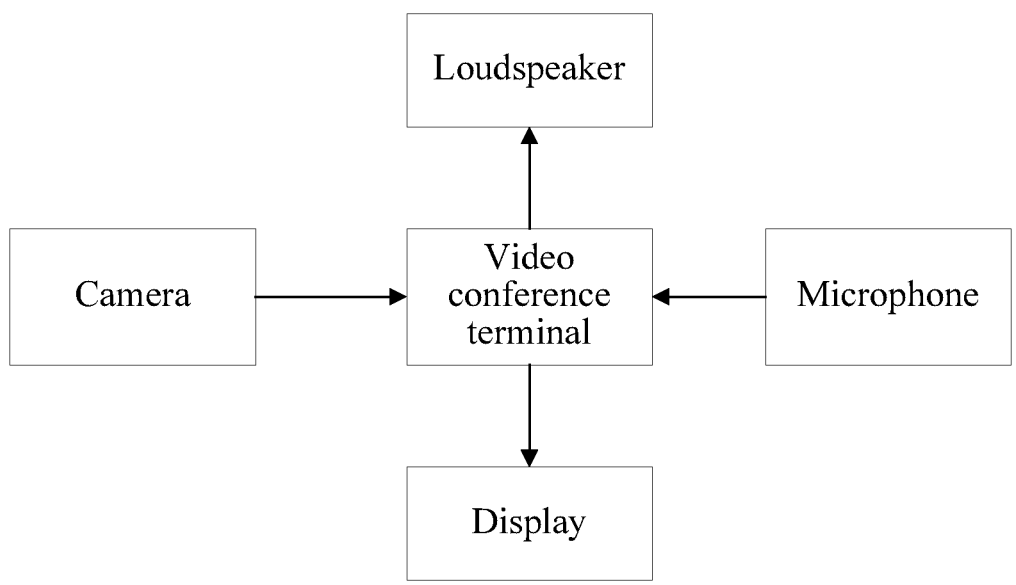
FIG. 2 is a schematic structural diagram of a video conference terminal subsystem in the prior art.
Figure 3:
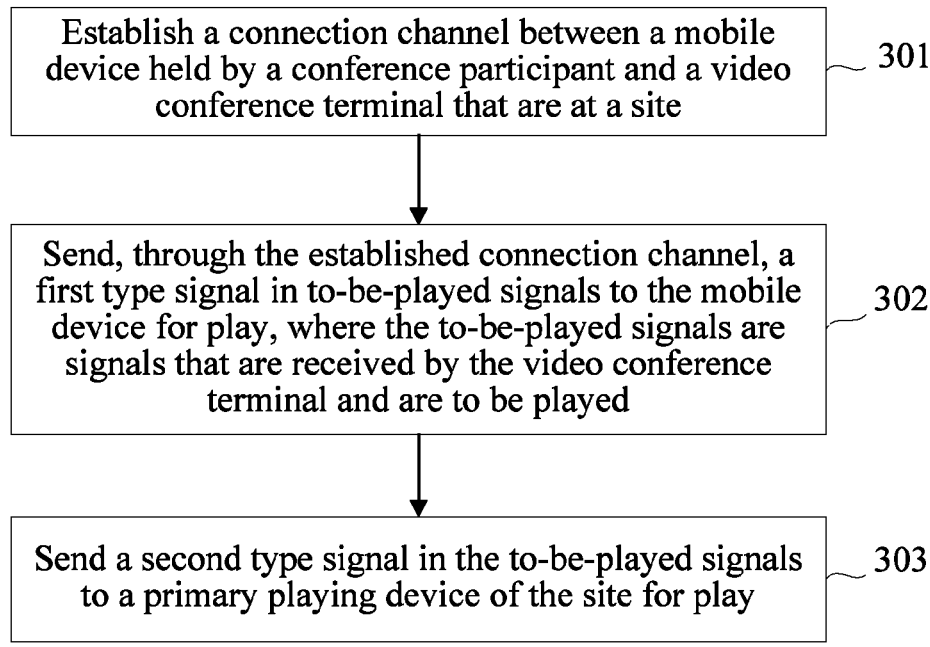
FIG. 3 is a schematic flowchart of a method for playing a conference signal according to an embodiment of the present disclosure.

As shown in FIG. 3, a method for playing a conference signal in this embodiment of the present disclosure includes the following steps.

Step 301: Establish a connection channel between a mobile device held by a conference participant and a video conference terminal that are at a site.

Step 302: Send, through the established connection channel, a first type signal in to-be-played signals to the mobile device for play, where the to-be-played signals are signals that are received by the video conference terminal and are to be played.

Step 303: Send a second type signal in the to-be-played signals to a primary playing device of the site for play.

In the to-be-played signals, the first type signal is a presentation stream signal, and the second type signal is a main stream signal, or the first type signal is a main stream signal, and the second type signal is a presentation stream signal.

It should be noted that, an execution body in this embodiment of the present disclosure may be a VCT, or a control device for controlling a VCT, where the control device for controlling a VCT may be disposed inside or outside the VCT.

This embodiment of the present disclosure is introduced below using an example in which the execution body is a control device for controlling a VCT. An implementation manner in which the execution body is a VCT is similar to that in this embodiment of the present disclosure, except that when the execution body is a control device for controlling a VCT, the VCT executes a corresponding operation under control of the control device, while when the execution body is a VCT, the VCT proactively executes a corresponding operation.

Preferably, the mobile device held by the conference participant in this embodiment of the present disclosure is a smart mobile terminal, for example, a tablet computer (e.g. an iPAD), a notebook computer, or a smartphone.

During implementation, the mobile device held by the conference participant in this embodiment of the present disclosure may be a single-touch or multi-touch device.

Preferably, the primary playing device in this embodiment of the present disclosure is a playing device that has one or more of the following capabilities: a picture playing capability, an audio playing capability, and a video playing capability, for example, a television, a sound box, or the like.

Preferably, the primary playing device in this embodiment of the present disclosure may be a device shared by conference participants at the site (that is, a device that may be seen and/or heard by all the conference participants at the site), for example, a large screen at the site.

During implementation, the mobile device occupies little space and is portable.

During implementation, the to-be-played signals in this embodiment of the present disclosure are signals received from an MCU in real time by a VCT. For example, if site A and site B hold a conference simultaneously, at a particular moment, a video conference terminal subsystem at site A collects signals of site A in real time, and pre-processes the signals collected in real time and then sends the pre-processed signals to the MCU. When determining that a video conference terminal subsystem at site B has permission to view signals from site A, the MCU sends the signals of site A that are collected in real time to the video conference terminal subsystem at site B in real time, such that the signals (signals collected at site A in real time) received from the MCU in real time by the video conference terminal subsystem at site B are the to-be-played signals.

During implementation, a main stream signal is a signal that is collected in real time at a site corresponding to a conference location, for example, an image signal, a speech signal, or a video signal that is collected in real time. A presentation stream signal is another signal except the main stream signal of the site corresponding to the conference location, for example, a shared video signal or a data signal corresponding to a shared document.

Preferably, the first type signal is a presentation stream signal by default, and the second type signal is a main stream signal by default.

It should be noted that, in this embodiment of the present disclosure, step 301 may be performed first, and then step 303 is performed; step 303 may be performed first, and then step 301 is performed; or step 301 and step 303 may be performed simultaneously.

During implementation, a method for establishing a connection channel between a primary playing device and a VCT at a site in this embodiment of the present disclosure may be the same as a method for establishing a connection channel between a primary playing device and a VCT at a site in the prior art.

Preferably, after a connection channel between a primary playing device and a VCT at a site is established, the VCT may be controlled to manage the primary playing device for which the connection channel has been established. For example, the VCT manages, using a list, the primary playing device for which the connection channel has been established.

Figure 4:
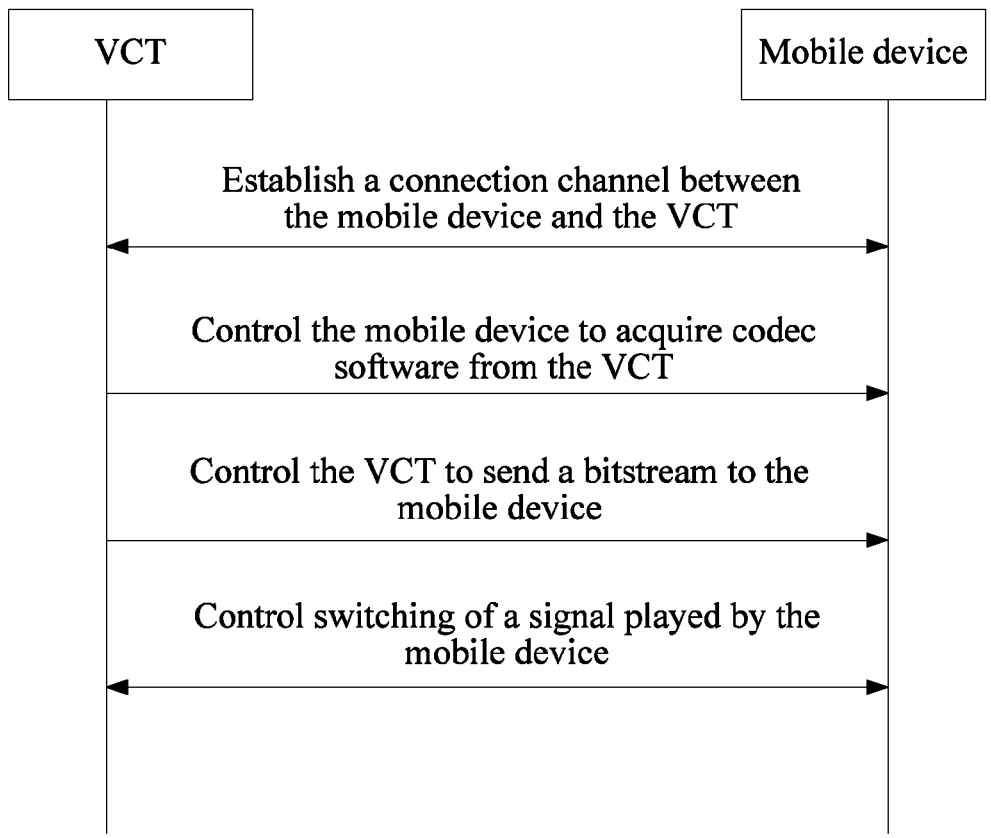
FIG. 4 is a schematic diagram of an interaction process between a VCT and a mobile device according to an embodiment of the present disclosure.

During implementation, a VCT may be controlled to perform multiple types of interactions with a mobile device. As shown in FIG. 4, a connection channel between a mobile device and a VCT may be established, the mobile device may be controlled to acquire codec software, the VCT may be controlled to send a bitstream to the mobile device, switching of a signal played by the mobile device may be controlled, and the like, which are introduced below.

During implementation, in step 301, a connection channel between one mobile device and a VCT that are at the site may be established, or a connection channel between multiple mobile devices and the VCT that are at the site may be established.

Preferably, in step 301, establishing a connection channel between a mobile device and a VCT at a site includes sending, to all mobile devices at the site, query messages about whether the mobile devices agree to establish connections to the VCT and establishing a connection channel between the VCT and a mobile device that returns a message of agreement.

During implementation, query messages may be sent to all the mobile devices at the site, or a query message may be sent to a selected mobile device. For example, a conference participant at the site may be determined first, and then a message is sent to a mobile device held by the conference participant.

Preferably, in step 301, establishing a connection channel between a mobile device held by a conference participant and a video conference terminal that are at a site includes establishing a direct connection channel between the mobile device held by the conference participant and a VCT that are at the site or establishing, using another mobile device, an indirect connection channel between the mobile device held by the conference participant and a VCT that are at the site.

Figure 5A:
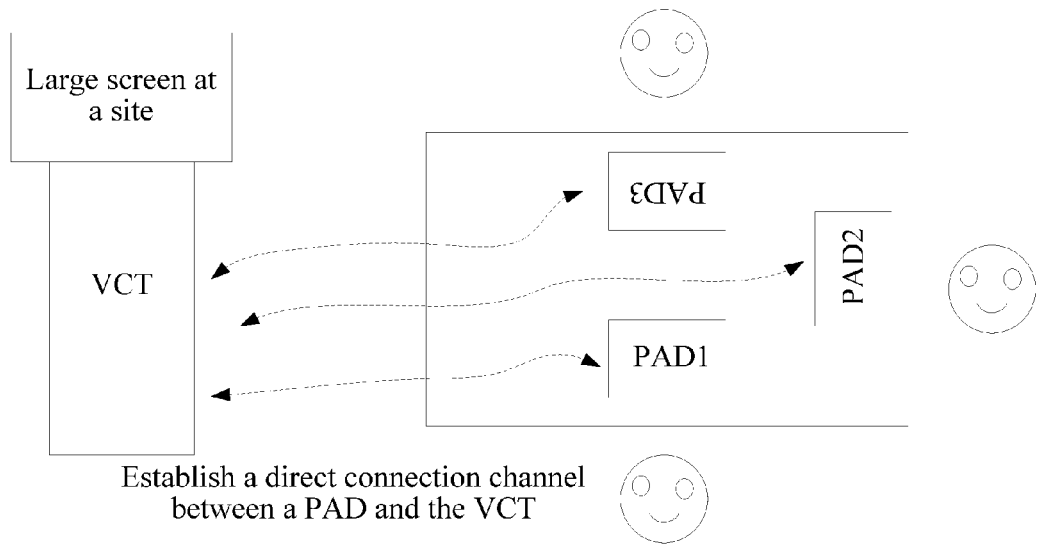
FIG. 5A to FIG. 5B are schematic diagrams of a method for establishing a connection channel between a mobile device and a VCT according to an embodiment of the present disclosure.

The direct connection channel between the mobile device and the VCT refers to a channel on which no routing mobile device (or relay mobile device) exists between the mobile device and the VCT, and the mobile device is directly connected to the VCT, which is shown in FIG. 5A.

Figure 5B:
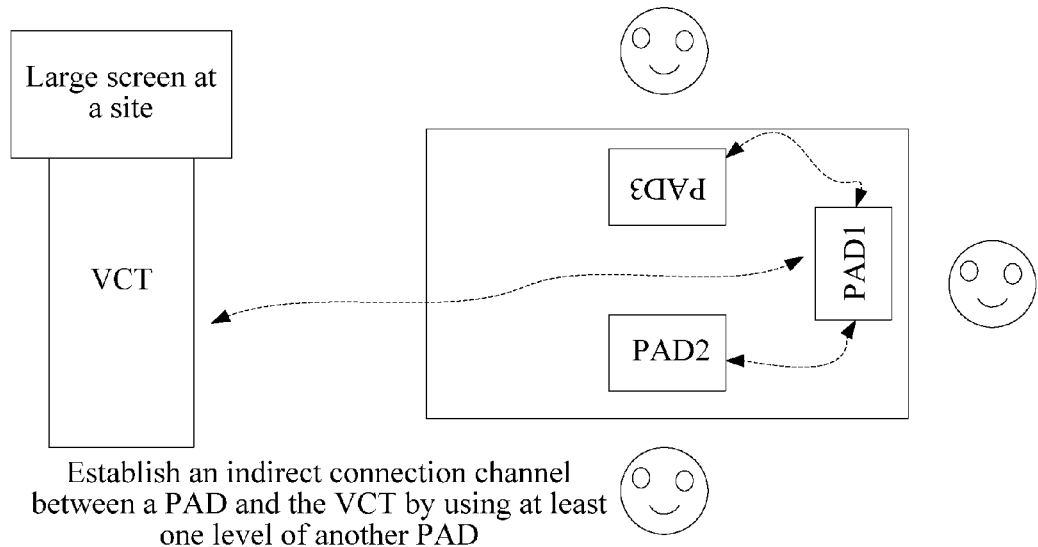

The indirect connection channel between the mobile device and the VCT includes a connection channel between the mobile device and a routing mobile device (or a relay mobile device), and a connection channel between the routing mobile device (or the relay mobile device) and the VCT (that is, the mobile device is not directly connected to the VCT, and a routing mobile device or a relay mobile device exists between the mobile device and the VCT), which is shown in FIG. 5B.

It should be noted that, in step 301, a direct connection channel between the mobile device held by the conference participant and the VCT that are at the site may be established, or an indirect connection channel between the mobile device held by the conference participant and the VCT that are at the site may be established using at least one level of another mobile device.

Preferably, in step 301, establishing a connection channel between a mobile device held by a conference participant and a VCT at a site includes establishing a wireless connection channel between the mobile device held by the conference participant and the VCT that are at the site or establishing a wired connection channel between the mobile device held by the conference participant and the VCT that are at the site.

Preferably, establishing a wireless connection channel between the mobile device held by the conference participant and the VCT that are at the site includes establishing the wireless connection channel between the mobile device and the VCT based on a wireless communications protocol (for example, wireless internet protocol (IP)) or a short-range communications protocol (for example, Bluetooth®).

For example, using an example in which the wireless connection channel between the mobile device and the VCT is established based on wireless IP, a wireless service set identifier (SSID) of the mobile device is controlled to be configured as a wireless SSID of the VCT, thereby implementing establishment of the wireless connection channel between the mobile device and the VCT based on wireless IP.

Preferably, establishing a wired connection channel between the mobile device held by the conference participant and the VCT that are at the site includes establishing the wired connection channel between the mobile device held by the conference participant and the VCT that are at the site based on wired IP, the public switched telephone network (PSTN) protocol, the integrated services digital network (ISDN) protocol, or the E1 (2.048 Megabits per second (Mbit/s)) network protocol.

For example, using an example in which the wired connection channel between the mobile device and the VCT is established based on wired IP, an IP address of the mobile device is controlled to be configured as an IP address of the VCT, thereby implementing establishment of the wired connection channel between the mobile device and the VCT based on wired IP.

Preferably, after the connection channel between the mobile device and the VCT is established, the VCT may be controlled to manage the mobile device for which the connection channel has been established. For example, the VCT manages, using a list, the mobile device for which the connection channel has been established.

Preferably, after the connection channel between the mobile device and the VCT is established, the VCT may be controlled to acquire capability information of the mobile device, for example, a video protocol and an audio protocol that are supported by the mobile device (for example, an audio protocol supporting G.711, and an audio protocol supporting H.264), an audio processing capability, a video processing capability, and display specifications (for example, a resolution list, maximum resolution, and a frame rate).

Preferably, in step 302, controlling the VCT to send a first type signal in to-be-played signals to the mobile device for play includes controlling the VCT to determine, according to the capability information of the mobile device, resolution of the first type signal to be sent to the mobile device, and sending the first type signal whose resolution is the determined resolution to the mobile device.

Preferably, when multiple mobile devices are controlled to establish connection channels with the VCT, in step 302, controlling the VCT to send a first type signal in to-be-played signals to the mobile device for play includes controlling the VCT to determine resolution of a first type signal that is corresponding to a mobile device with a minimum processing and display capability among the multiple mobile devices, and sending the first type signal whose resolution is the determined resolution to the multiple mobile devices.

During implementation, the first type signal sent to the mobile device is determined according to the capability information of the mobile device, such that a play effect of the mobile device is improved.

Preferably, in step 302, controlling the VCT to send a first type signal in to-be-played signals to the mobile device for play includes controlling the VCT to encode the first type signal and sending a bitstream corresponding to the encoded first type signal to the mobile device.

During implementation, the first type signal is encoded and then sent to the mobile device, such that efficiency of transmitting the first type signal can be improved.

During implementation, the VCT is controlled to send, to a first type mobile device, the bitstream corresponding to the encoded first type signal. The mobile device needs to have a codec capability (such as an audio codec capability, a video codec capability, and a document codec capability), that is, codec software such as H.264 (video codec software) and G.711 (audio codec software) needs to be installed and run in the mobile device.

During implementation, the mobile device acquires codec software in multiple manners. For example, the VCT may be controlled to send codec software to the mobile device, or the mobile device may log in to a web of the VCT to download codec software supported by the mobile device. For example, if the mobile device is a device that runs an Android system, the mobile device downloads codec software that supports the Android system; if the mobile device is a PAD that runs iOS (an operating system), the mobile device downloads codec software that supports the iOS, and pre-installs the software in the application store (App Store) in advance.

Preferably, connection channels between multiple mobile devices and the VCT are established, and in step 302, controlling the VCT to send a first type signal in to-be-played signals to the multiple mobile devices includes controlling the VCT to perform, according to capability information of the multiple mobile devices, encoding and adaptation on bitstreams corresponding to first type signals of the multiple mobile devices, and sending the bitstreams after encoding and adaptation to the multiple mobile devices.

During implementation, after the codec software is installed and run in the mobile device, the VCT establishes a bitstream transmission channel with the mobile device.

It should be noted that, in step 302, the VCT may be controlled to proactively send the first type signal to the mobile device, or the VCT may be controlled to send, at a request of the mobile device, the first type signal requested by the mobile device to the mobile device. If the VCT is controlled to send, at a request of the mobile device, the first type signal requested by the mobile device to the mobile device, before the VCT is controlled to send the first type signal in the to-be-played signals to the mobile device, the VCT needs to be controlled to send classification information of the to-be-played signals to the mobile device.

Preferably, before the VCT is controlled to send the first type signal in the to-be-played signals to the mobile device, the method further includes controlling the VCT to send classification information of the to-be-played signals to the mobile device, to instruct the mobile device to determine, according to the classification information of the to-be-played signals, a play request message including information about a signal requested to be played by the mobile device. Controlling the VCT to send a first type signal in to-be-played signals to the mobile device includes controlling the VCT to send, to the mobile device according to the play request message received from the mobile device, the first type signal that is in the to-be-played signals and is requested to be played by the mobile device.

During implementation, the first type signal sent to the mobile device is determined according to a request of the mobile device, such that efficiency of communication between the mobile device and the VCT can be improved, and conference efficiency is improved.

Preferably, the first type signal includes different subtype signals.

During implementation, the main stream signal may include different subtype signals. For example, the main stream signal includes an image signal collected in real time and a speech signal collected in real time.

During implementation, the presentation stream signal may include different subtype signals. For example, the presentation stream signal includes different conference materials (for example, a dynamic video, a document, or a demonstration slide that is shared by another site).

Preferably, controlling the VCT to send a first type signal to the mobile device for play includes controlling the VCT to send information about the different subtype signals included in the first type signal to the mobile device; receiving information about a subtype signal that is sent by the mobile device according to the information about the different subtype signals and requested to be played; and sending the subtype signal that is requested to be played by the mobile device and included in the different subtype signals to the mobile device that sends the information about the subtype signal requested to be played for play, or to all mobile devices at the site for play.

Preferably, after controlling the VCT to send a first type signal to the mobile device for play, and sending a second type signal to a primary playing device for play, the method further includes controlling the VCT to send, through the established connection channel, the received second type signal in the to-be-played signals to the mobile device, to instruct the mobile device to stop playing the currently played first type signal, and start to play the second type signal; and/or controlling the VCT to send the received first type signal in the to-be-played signals to the primary playing device of the site, to instruct the primary playing device to stop playing the currently played second type signal, and start to play the first type signal.

During implementation, when the VCT is controlled to send the second type signal to the mobile device, a signal played by the mobile device is switched from the first type signal to the second type signal, and the primary playing device and the mobile device play the second type signal simultaneously; when the VCT is controlled to send the first type signal to the primary playing device, a signal played by the primary playing device is switched from the second type signal to the first type signal, and the primary playing device and the mobile device play the first type signal simultaneously; when the VCT is controlled to send the second type signal to the mobile device and send the first type signal to the primary playing device, a signal played by the mobile device is switched from the first type signal to the second type signal, and a signal played by the primary playing device is switched from the second type signal to the first type signal.

It should be noted that, after the mobile device is controlled to play the first type signal and the primary playing device is controlled to play the second type signal, the VCT may be controlled to proactively control switching of a signal played by the mobile device and/or the primary playing device, or the VCT may be controlled to control, according to a request of the mobile device, switching of a signal played by the mobile device and/or the primary playing device, which is introduced below.

B1. A case in which the VCT is controlled to control, according to a request of the mobile device, switching of a signal played by the mobile device Preferably, before the VCT is controlled to send the second type signal in the to-be-played signals to the mobile device, the method further includes controlling the VCT to send classification information of the to-be-played signals to the mobile device; and confirming that the VCT receives a switching play request message for switching the first type signal currently played by the mobile device to the second type signal to be played that is sent by the mobile device according to the classification information of the to-be-played signals.

B2. A case in which the VCT is controlled to control, according to a request of the mobile device, switching of a signal played by the primary playing device Before the VCT is controlled to send the first type signal in the to-be-played signals to the primary playing device of the site, the method further includes controlling the VCT to send classification information of the to-be-played signals to the mobile device; and confirming that the VCT receives a switching play request message for switching the second type signal currently played by the primary playing device to play the first type signal that is sent by the mobile device according to the classification information of the to-be-played signals.

B3. A case in which the VCT is controlled to control, according to a request of the mobile device, switching of signals played by the mobile device and the primary playing device Preferably, before the VCT is controlled to send the second type signal in the to-be-played signals to the mobile device and send the first type signal in the to-be-played signals to the primary playing device, the method further includes controlling the VCT to send classification information of the to-be-played signals to the mobile device; and confirming that the VCT receives a switching play request message for switching the first type signal currently played by the mobile device to the second type signal to be played that is sent by the mobile device according to the classification information of the to-be-played signals, and switching the second type signal currently played by the primary playing device to play the first type signal.

It should be noted that, the VCT may be controlled to directly approve, after the VCT receives the switching play request message, information requested by the switching play request message, and perform a corresponding switching operation, or the VCT may be controlled to perform, after the VCT receives the switching play request message, switching control on a signal played by the primary playing device and/or the mobile device, for the play request message and according to a first switching policy.

Preferably, for case B1, before the VCT is controlled to send the second type signal in the to-be-played signals to the mobile device, the method further includes controlling the VCT to send classification information of the to-be-played signals to the mobile device; confirming that the VCT receives a switching play request message for switching the first type signal currently played by the mobile device to the second type signal to be played that is sent by the mobile device according to the classification information of the to-be-played signals; and controlling the VCT to determine, according to a first switching policy, to send the second type signal in the to-be-played signals to the mobile device.

During implementation, implementation manners of case B2 and case B3 are similar to that of case B1, which are not described herein again.

During implementation, the first switching policy may be determined according to a specific requirement.

Preferably, the first switching policy includes one or more of the following.

1. Determine a master mobile device, and after the master mobile device approves information requested by a switching play request message, perform, according to the switching play request message, switching control on a signal played by the primary playing device and/or the mobile device.

During implementation, the VCT is controlled to determine a master mobile device using multiple methods, which may be set as required. For example, the VCT is controlled to determine a master mobile device according to capability information of the mobile device, or the VCT is controlled to determine a master mobile device according to an account number used by the mobile device to log in when a connection channel is established between the VCT and the mobile device.

During implementation, a master mobile device may be determined again.

2. If a switching play request message requests to switch a signal played by the mobile device is sent, the signal played by the mobile device is switched. After switching the signal played by the mobile device, it is determined whether a signal played by the mobile device and a signal played by the primary playing device are of a same type. In one embodiment, if the signals played by the mobile device and the primary playing device are of the same type, the signal played by the mobile device is not switched again. Alternatively, the signal played by the mobile device and the signal played by the primary playing device may be switched to a type of signal different from the signal played by the mobile device.

3. If a switching play request message requests to switch a signal played by the primary playing device is sent, the signal played by the primary playing device is switched. After switching the signal played by the primary playing device, it is determined whether a signal played by the primary playing device and a signal played by the mobile device are of a same type. In one embodiment, if the signals played by the primary playing device and the mobile device are of the same type, the signal played by the primary playing device is not switched again. Alternatively, the signal played by the primary playing device and the signal played by the mobile device may be switched to a type of signal different from the signal played by the primary playing device.

4. If a switching play request message requests to switch a signal played by the mobile device that sends the switching play request message, the signal played by the mobile device or signals played by all mobile devices may be switched.

5. If a switching play request message requests to switch signals played by all mobile devices and if a quantity of the same switching play request messages that are sent by a subset of all of the mobile devices exceeds a set number that is received within a set time period, the signals played by all the mobile devices are switched.

6. If a switching play request message requests to switch a signal played by the primary playing device and if it is determined that a quantity of the mobile devices that agree to switch the signal played by the primary playing device exceeds a set number, the signal played by the primary playing device is switched.

7. If a switching play request message requests to switch signals played by all mobile devices and if a quantity of the same switching play request messages that are sent by the mobile devices exceeds a set number that is received within a set time period, a signal currently played by the primary playing device may be switched to a signal to be as requested by the switching play request message.

During implementation, the first switching policy may be determined according to an application scenario, an actual requirement, or experience. For example, the first switching policy may further include controlling, according to a switching play request message, a signal played by the primary playing device after switching and/or a signal played by the mobile device after switching to be a main stream signal.

It should be noted that, the first switching policy may be changed according to a requirement of an application scenario, and therefore, it is impossible to list all switching policies.

During implementation, switching of a signal played by the mobile device and/or the primary playing device may be controlled according to a switching play request message sent by the mobile device, thereby improving a display effect.

During implementation, the mobile device may be controlled to perform switching between two types of signals and/or the primary playing device may be controlled to perform switching between two types of signals, or the mobile device may be controlled to perform switching among different subtype signals included in a type of signal and/or the primary playing device may be controlled to perform switching among different subtype signals included in a type of signal, which is introduced below.

During implementation, in a case in which the first type signal includes different subtype signals, when the VCT is controlled to proactively control switching of a signal played by the mobile device, the VCT may be controlled to send a subtype signal included in the first type signal to the mobile device, to instruct the mobile device to stop playing a currently played signal, and start to play the received subtype signal sent by the VCT, thereby controlling a signal played by the mobile device to be switched among the different subtype signals included in the first type signal. It should be noted that, when the first type signal includes different subtype signals, the VCT may be controlled to proactively control switching of a signal played by the mobile device, or the VCT may be controlled to control, according to a request of the mobile device, switching of a signal played by the mobile device, which is introduced below.

Preferably, the first type signal in this embodiment of the present disclosure includes different subtype signals, and the method for playing a conference signal in this embodiment of the present disclosure further includes controlling the VCT to send information about the different subtype signals included in the first type signal to the mobile device.

After controlling the VCT to send a first type signal to the mobile device for play, the method further includes receiving information about a subtype signal to which the signal currently played by the mobile device is requested to be switched that is sent by the mobile device according to the information about the different subtype signals; and sending the subtype signal that is included in the subtype signals and to which the signal currently played by the mobile device is to be switched, to the mobile device that sends the information about the subtype signal to which the signal currently played by the mobile device is requested to be switched for play, or to all mobile devices at the site for play.

Preferably, the first type signal is a presentation stream signal.

During implementation, the VCT may be controlled to send, before the first type signal is sent to the mobile device for play, the information about the different subtype signals included in the first type signal to the mobile device; the VCT may be controlled to send, after the first type signal is sent to the mobile device for play, the information about the different subtype signals included in the first type signal to the mobile device; or the VCT may be controlled to send, while the first type signal is sent to the mobile device for play, the information about the different subtype signals included in the first type signal to the mobile device, which may be set as required.

During implementation, an implementation manner when the second type signal includes different subtype signals is similar to an implementation manner of the first type signal, and the mobile device needs to be controlled to send a request for switching the signal currently played by the primary playing device among the different subtype signals included in the second type signal.

Preferably, the second type signal is a main stream signal.

It should be noted that, it may be controlled, after the information about the subtype signal that is sent by the mobile device and to which the signal currently played by the mobile device is requested to be switched is received, to directly send the subtype signal corresponding to the information about the subtype signal to the mobile device that sends the request or to all mobile devices, or it may be controlled, after the information about the subtype signal to which the signal currently played by the mobile device is requested to be switched that is sent by the mobile device is received, to perform switching control on the signal played by the mobile device, for the information about the subtype signal requested to be played and according to a second switching policy.

During implementation, an implementation manner of the second switching policy is similar to that of the first switching policy.

During implementation, switching of the signal played by the mobile device may be controlled according to the information about the subtype signal requested to be played that is sent by the mobile device, thereby improving a display effect and conference efficiency.

2. A method for playing a conference signal in this embodiment of the present disclosure is introduced in detail from the side of a mobile device.

Figure 6:
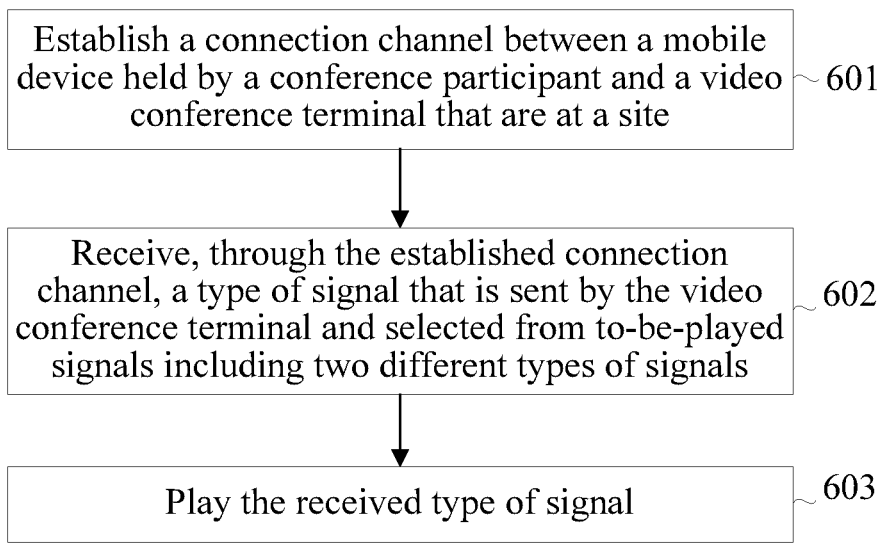
FIG. 6 is a schematic flowchart of a method for playing a conference signal according to an embodiment of the present disclosure.

As shown in FIG. 6, a method for playing a conference signal in this embodiment of the present disclosure includes the following steps.

Step 601: Establish a connection channel between a mobile device held by a conference participant and a video conference terminal that are at a site.

Step 602: Receive, through the established connection channel, a type of signal that is sent by the video conference terminal and selected from to-be-played signals including two different types of signals.

Step 603: Play the received type of signal.

The type of signal is a presentation stream signal or a main stream signal.

Preferably, the type of signal is a presentation stream signal.

During implementation, the mobile device plays a type of signal in to-be-played signals including two different types of signals, and another device (for example, a primary playing device) at the site plays another type of signal in the to-be-played signals, thereby improving effects of displaying a main stream signal and a presentation stream signal.

It should be noted that, an execution body in this embodiment of the present disclosure may be a mobile device, or a control device for controlling a mobile device, where the control device for controlling a mobile device may be disposed inside or outside the mobile device.

This embodiment of the present disclosure is introduced below using an example in which the execution body is a control device for controlling a mobile device. An implementation manner in which the execution body is a mobile device is similar to that in this embodiment of the present disclosure, except that when the execution body is a control device for controlling a mobile device, the mobile device executes a corresponding operation under control of the control device, while when the execution body is a mobile device, the mobile device proactively executes a corresponding operation. During implementation, in step 601, a connection channel between one mobile device and a VCT that are at the site may be established, or a connection channel between multiple mobile devices and a VCT that are at the site may be established.

Preferably, in step 601, establishing a connection channel between a mobile device held by a conference participant and a video conference terminal that are at a site includes establishing a direct connection channel between the mobile device held by the conference participant and the video conference terminal that are at the site; or establishing, using another mobile device, an indirect connection channel between the mobile device held by the conference participant and the video conference terminal that are at the site.

Preferably, in step 601, establishing a connection channel between a mobile device held by a conference participant and a video conference terminal that are at a site includes establishing a wireless connection channel between the mobile device held by the conference participant and the video conference terminal that are at the site; or establishing a wired connection channel between the mobile device held by the conference participant and the video conference terminal that are at the site.

During implementation, an implementation manner of establishing a connection channel between a mobile device and a VCT in FIG. 6 of this embodiment of the present disclosure is similar to that of establishing a connection channel between a mobile device and a VCT in FIG. 3 of this embodiment of the present disclosure, which is not described herein again.

During implementation, the mobile device may be controlled to receive a type of signal that is determined by the VCT and selected from the to-be-played signals including two different types of signals, or the mobile device may be controlled to receive a type of signal proactively requested by the mobile device, which is introduced below.

Preferably, before step 602, the method further includes controlling the mobile device to receive, through the established connection channel, classification information of the to-be-played signals that is sent by the VCT, and determining, according to the received classification information, information about a signal requested to be played; and controlling the mobile device to send a play request message including the determined information about the signal to the VCT.

In step 602, controlling the mobile device to receive a type of signal that is sent by the VCT and selected from to-be-played signals includes controlling the mobile device to receive, through the established connection channel, a type of signal that is selected by the VCT according to the information about the signal included in the play request message, from the to-be-played signals including two different types of signals.

Preferably, the type of signal includes different subtype signals.

Controlling the mobile device to receive a type of signal sent by the VCT includes controlling the mobile device to receive, through the connection channel, information about the different subtype signals included in the type of signal, where the information is sent by the VCT; controlling the mobile device to send, to the VCT through the connection channel according to the received information about the different subtype signals included in the type of signal, information about a subtype signal requested to be played; and controlling the mobile device to receive, through the connection channel, the subtype signal selected by the VCT according to the information about the subtype signal requested to be played, from the different subtype signals included in the type of signal in the to-be-played signals including two different types of signals.

During implementation, the mobile device may be controlled for passive switching of a played signal, or the mobile device may be controlled to proactively request to switch a played signal. The implementation manner of this embodiment of the present disclosure is introduced below using an example in which two different types of signals included in to-be-played signals are a first type signal and a second type signal, and in step 603, a signal played by the mobile device is a first type signal.

Preferably, after controlling the mobile device to play the received first type signal, the method further includes controlling the mobile device to receive, through the established connection channel, classification information of the to-be-played signals that is sent by the VCT; controlling the mobile device to send, to the VCT according to the received classification information of the to-be-played signals, a first switching play request message for requesting to switch the first type signal currently played by the mobile device to the second type signal to be played that is included in the to-be-played signals; and/or send, to the VCT, a second switching play request message for requesting to switch the second type signal currently played by the primary playing device of the site to play the first type signal; controlling the mobile device to receive the second type signal that is sent by the VCT according to the first switching play request message; and controlling the mobile device to stop playing the currently played first type signal, and start to play the received second type signal.

Preferably, the first type signal includes different subtype signals; after controlling the mobile device to play the received first type signal, the method further includes controlling the mobile device to receive, through the established connection channel, information about the different subtype signals included in the first type signal, where the information is sent by the VCT; controlling the mobile device to send, to the VCT through the connection channel according to the information about the different subtype signals included in the received first type signal, information about a subtype signal to which the signal currently played by the mobile device is requested to be switched; and controlling the mobile device to receive, through the connection channel, the subtype signal selected by the VCT according to the information about the subtype signal to which the signal currently played by the mobile device is requested to be switched, from the different subtype signals included in the first type signal; and controlling the mobile device to play the received subtype signal.

Several exemplary implementation manners of the method for playing a conference signal of the embodiments of the present disclosure are listed below, and implementation manners in other cases are similar to the several exemplary implementation manners of the embodiments of the present disclosure, which are not described herein again.

Embodiment 1

Figure 7A:
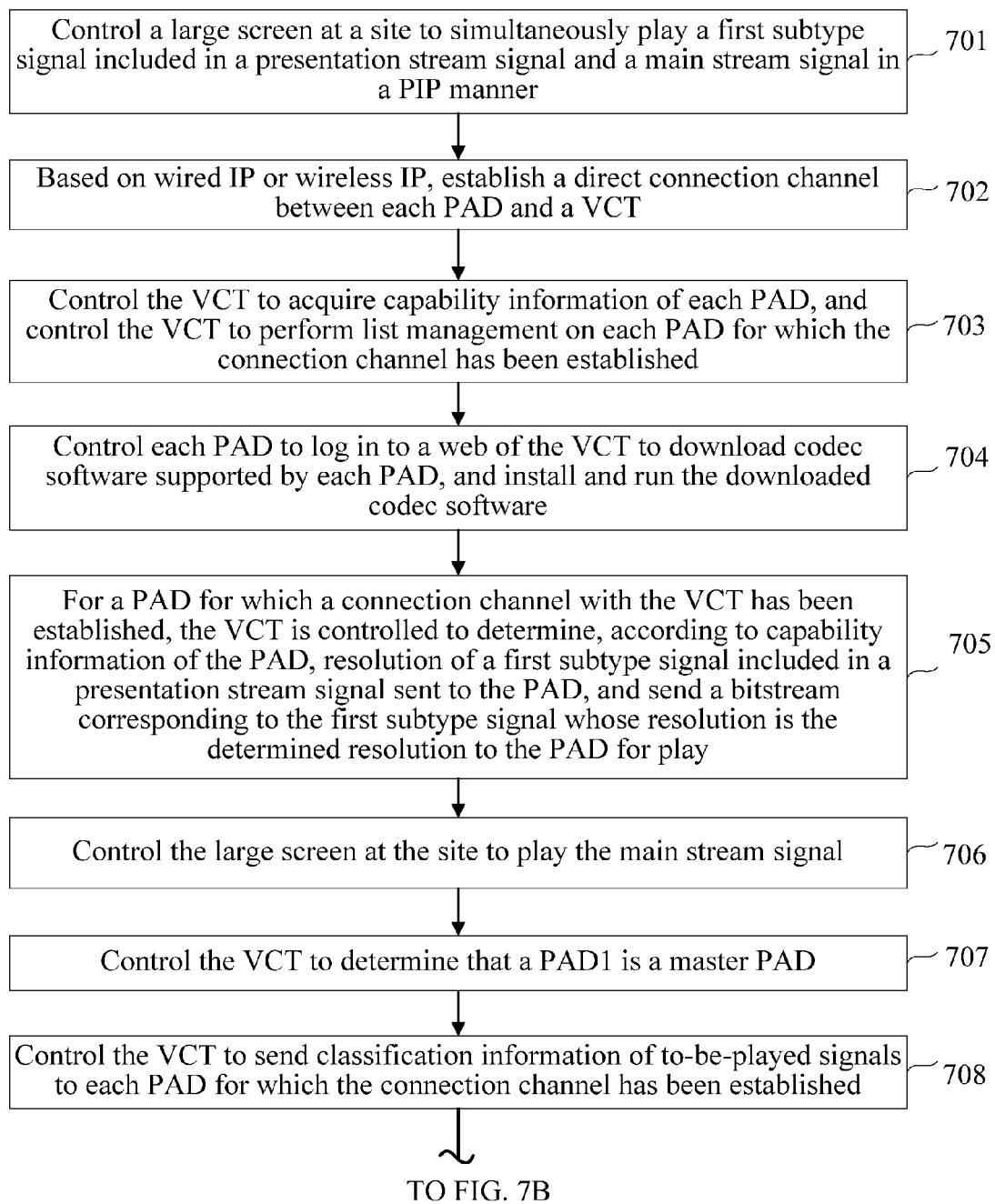

As shown in FIG. 7A and FIG. 7B, a method for playing a conference signal in this embodiment of the present disclosure is introduced using an example in which mobile devices are PADs, a primary playing device is a large screen at a site, and a direct connection channel is established between a mobile device held by a conference participant and a VCT at the site.

Step 701: Control the large screen at the site to simultaneously play a first subtype signal included in a presentation stream signal and a main stream signal in a PIP manner.

Step 702: As shown in FIG. 5A, based on wired IP or wireless IP, establish a direct connection channel between each PAD and the VCT.

Step 703: Control the VCT to acquire capability information of each PAD, and control the VCT to perform list management on each PAD for which the connection channel has been established.

Step 704: Control each PAD to log in to a web of the VCT to download codec software supported by each PAD, and install and run the downloaded codec software.

During implementation, the VCT may be controlled to control, in a manner of setting authentication, a PAD to log in to a web of the VCT to download codec software. For example, the VCT is controlled to only allow a PAD that logs in to the web of the VCT using a specified account number to download codec software.

Step 705: For a PAD for which a connection channel with the VCT has been established, the VCT is controlled to determine, according to capability information of the PAD, resolution of a first subtype signal included in a presentation stream signal sent to the PAD, and send a bitstream corresponding to the first subtype signal whose resolution is the determined resolution to the PAD for play.

During implementation, the VCT may also be controlled to perform, according to capability information of three PADs for which connection channels with the VCT have been established, encoding and adaptation on bitstreams corresponding to first subtype signals sent to the three PADs, and send the bitstreams obtained after the encoding and adaptation to the three PADs.

Step 706: Control the large screen at the site to play the main stream signal.

Step 707: Control the VCT to determine that a PAD1 is a master PAD.

Step 708: Control the VCT to send classification information of to-be-played signals to each PAD for which the connection channel has been established.

Step 709: A PAD2 sends, according to the classification information of the to-be-played signals, a switching play request message for requesting to switch the main stream signal currently played on the large screen at the site to the presentation stream signal (or an $N^{th}$ subtype signal of the presentation stream signal).

During implementation, N is a positive integer.

During implementation, each PAD for which the connection channel with the VCT has been established may determine, according to a message from the VCT, a signal played on the large screen at the site.

During implementation, when the switching play request message does not specify a subtype signal of the presentation stream signal to which the main stream signal is to be switched, the VCT may be controlled to determine a subtype signal of the presentation stream signal to which the main stream signal currently played on the large screen at the site is to be switched.

Step 710: Control the VCT to receive the switching play request message sent by the PAD2, and send the switching play request message to the master PAD1, to instruct the master PAD1 to determine whether to approve information requested by the switching play request message.

Step 711: According to a switching instruction sent by the master PAD1, determine whether the master PAD1 approves the information requested by the switching play request message, and when it is determined that the master PAD1 approves the information requested by the switching play request message, perform step 712; when it is determined that the master PAD1 does not approve the information requested by the switching play request message, perform step 713.

During implementation, the master PAD1 may determine, according to a first switching policy (such as the third item of the first switching policy or the sixth item of the first switching policy), a to-be-sent switching instruction.

Step 712: Control the VCT to send, according to the switching play request message, the first subtype signal of the presentation stream signal to the large screen at the site, to instruct the large screen to stop playing the currently played main stream signal, and start to play the first subtype signal of the presentation stream signal; and control the VCT to send, according to the third item of the first switching policy, the main stream signal to each PAD at the site, to instruct each PAD to stop playing the first subtype signal of the currently played presentation stream signal, and start to play the main stream signal.

During implementation, the VCT may not be controlled to send the main stream signal to each PAD at the site according to the third item of the first switching policy; or the VCT may be controlled to control, according to another switching policy, switching of a signal played on each PAD at the site.

Step 713: Control the VCT to send, according to the switching instruction sent by the master PAD1, to the PAD2 that sends the switching play request message, a message of not agreeing to switch.

Embodiment 2

Figure 8A:
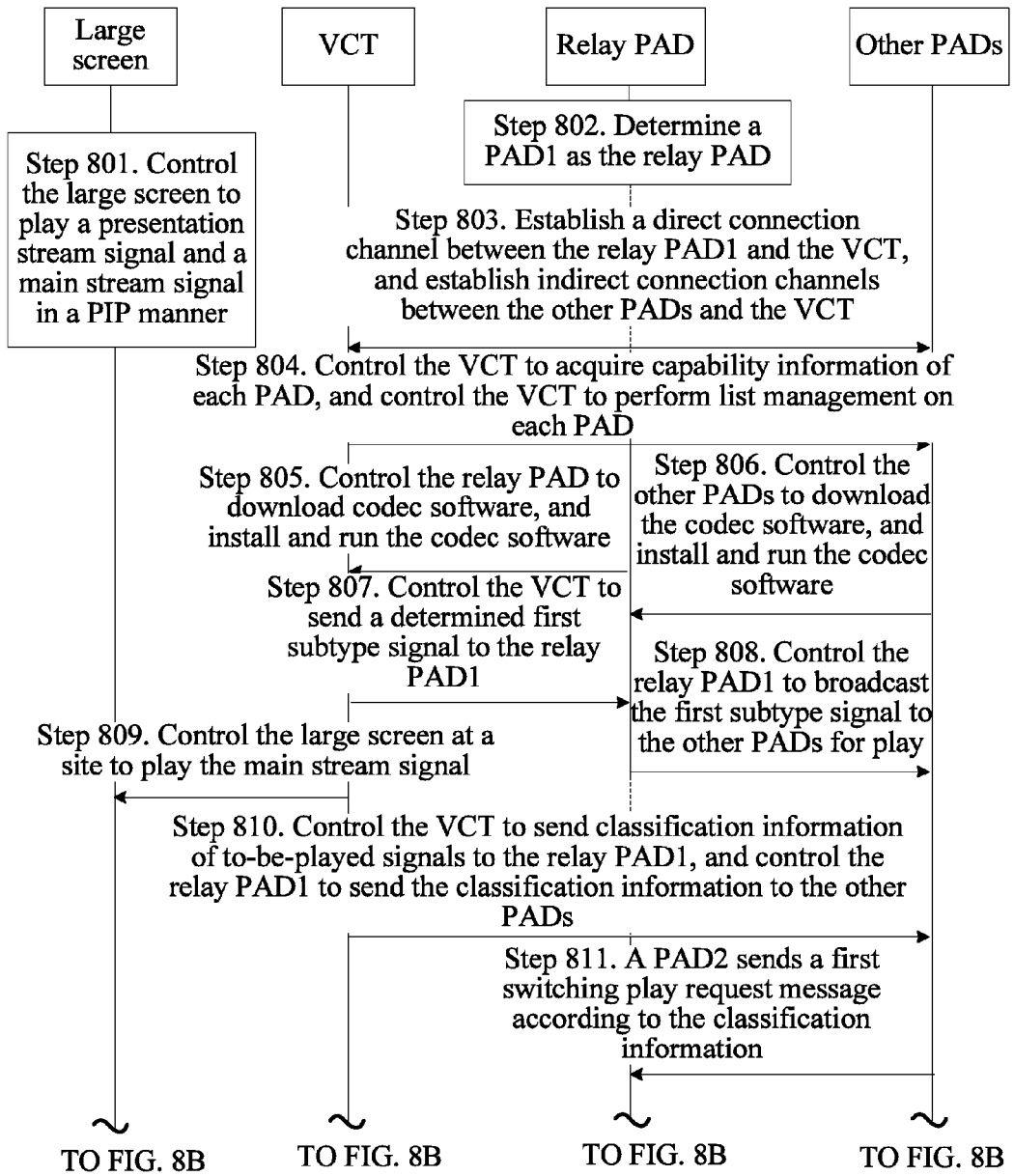
FIG. 8A and FIG. 8B are a detailed schematic flowchart of a method for playing a conference signal according to an embodiment of the present disclosure.
Figure 8B:
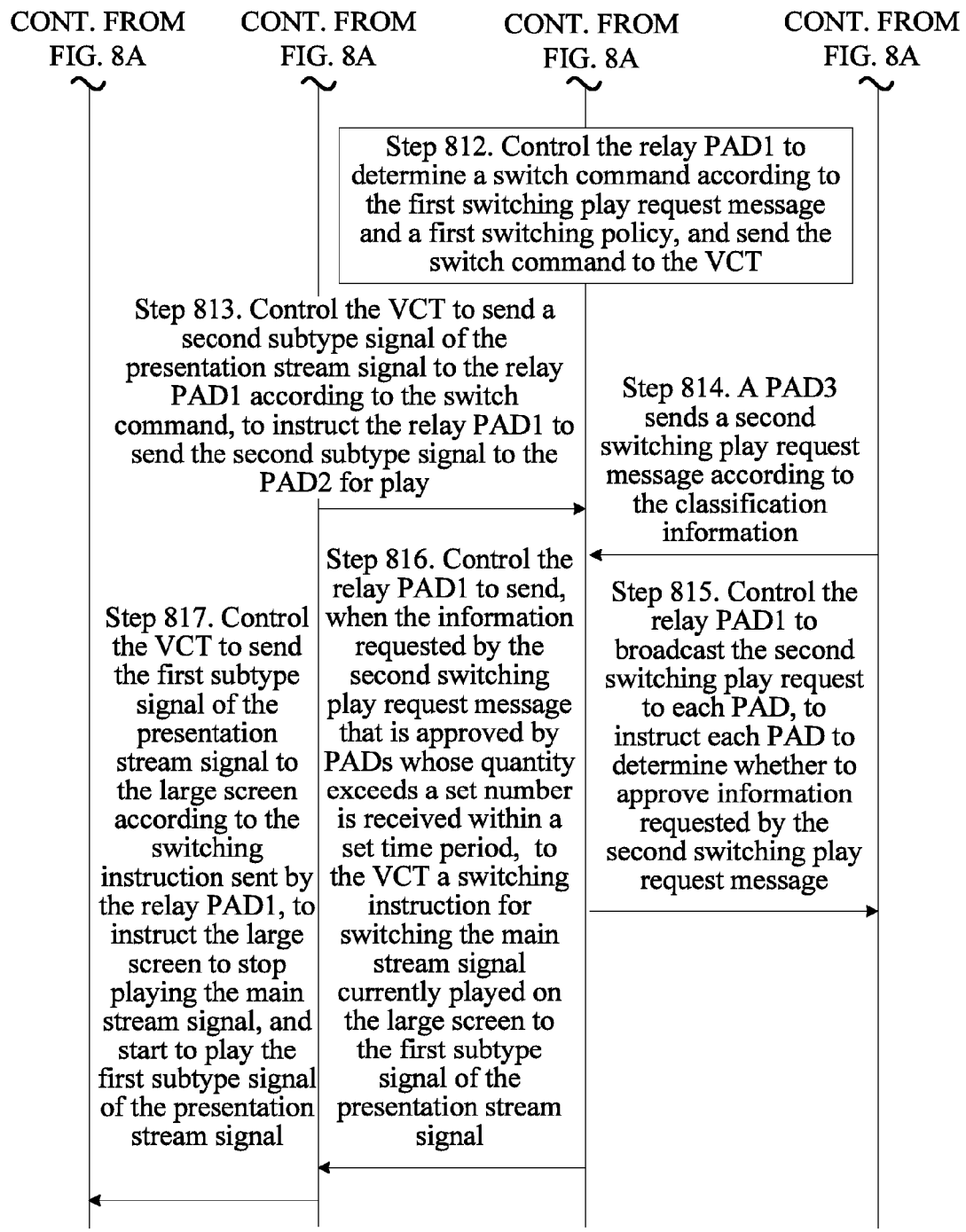

As shown in FIG. 8A and FIG. 8B, a method for playing a conference signal in this embodiment of the present disclosure is introduced using an example in which mobile devices are PADs, a primary playing device is a large screen at a site, and an indirect connection channel between a mobile device held by a conference participant and a VCT at the site is established using one level of another mobile device. It should be noted that, an implementation manner of establishing an indirect connection channel between a mobile device and a VCT using multiple levels of another mobile device is similar to that of establishing an indirect connection channel between a mobile device and a VCT using one level of another mobile device in this embodiment of the present disclosure, which is not described herein again.

Step 801: Control a large screen at a site to simultaneously play a first subtype signal included in a presentation stream signal and a main stream signal in a PIP manner.

Step 802: Determine a PAD1 as a relay PAD.

During implementation, an implementation manner of determining a relay PAD is similar to that of determining a master PAD, and may be determined randomly or according to an actual requirement.

Step 803: As shown in FIG. 5B, based on wired IP or wireless IP, establish a direct connection channel between the relay PAD1 and a VCT, and based on wired IP or wireless IP, establish an indirect connection channel between the VCT and the other PADs except the relay PAD1 at the site, where the channel passes the relay PAD1.

Step 804: Control the VCT to acquire capability information of each PAD, and control the VCT to perform list management on each PAD for which the direct connection channel and the indirect connection channel has been established.

During implementation, the relay PAD1 may be controlled to send capability information of another PAD connected to the relay PAD1 to the VCT connected to the relay PAD.

Step 805: Control the relay PAD to log in to a web of the VCT to download codec software supported by each PAD, and install and run the downloaded codec software supported by each PAD.

During implementation, the VCT may be controlled to control, in a manner of setting authentication, a PAD to log in to a web of the VCT to download codec software. For example, the VCT is controlled to only allow a PAD that logs in to the web of the VCT using a specified account number to download codec software.

Step 806: Control another PAD except the relay PAD1 at the site to log in to a web of the relay PAD1 to download codec software supported by the other PAD, and install and run the downloaded codec software.

During implementation, the relay PAD1 may be controlled to control, in a manner of setting authentication, another PAD to log in to the web of the relay PAD1 to download the codec software.

Step 807: Control the VCT to determine, according to capability information of each PAD, resolution of a first subtype signal included in a presentation stream signal corresponding to a PAD with a minimum processing and display capability among the PADs, and send the first subtype signal whose resolution is the determined resolution to the relay PAD1.

During implementation, if to-be-played signals only include main stream signals, the main stream signal whose resolution is the determined resolution is sent to the relay PAD1 for play.

Step 808: Control the relay PAD1 to broadcast the first subtype signal to the other PADs at the site for play.

Step 809: Control the large screen at the site to play the main stream signal.

Step 810: Control the VCT to send classification information of to-be-played signals to the relay PAD1 for which the direct connection channel with the VCT has been established, and control the relay PAD1 to send the classification information to the other PADs for which indirect connection channels with the VCT have been established.

Step 811: A PAD2 in the other PADs for which indirect connection channels with the VCT have been established sends, according to the classification information of the to-be-played signals, a first switching play request message for requesting to switch the first subtype signal included in the presentation stream signal currently played by the PAD2 to a second subtype signal included in the presentation stream signal.

Step 812: Control the relay PAD1 to determine, according to the first switching play request message sent by the PAD2, and according to the fourth item of a first switching policy, a switch command that switches the first subtype signal of the presentation stream signal currently played by the PAD2 to the second subtype signal of the presentation stream signal, and send the switch command to the VCT.

During implementation, the relay PAD1 may be controlled to send, to the VCT, the first switching play request message sent by the PAD2, and the VCT may be controlled to control, according to the first switching play request message, switching of a signal played by a PAD at the site.

During implementation, the relay PAD1 may be controlled to send to the PAD2, when information requested by the first switching play request message sent by the PAD2 is rejected, a message of not agreeing to switch.

Step 813: Control the VCT to send, according to the switch command sent by the relay PAD1, the second subtype signal of the presentation stream signal to the relay PAD1, to instruct the relay PAD1 to send the second subtype signal of the presentation stream signal to the PAD2 for play.

Step 814: A PAD3 in the other PADs for which indirect connection channels with the VCT have been established sends, according to the classification information of the to-be-played signals, a second switching play request message for requesting to switch the main stream signal currently played on the large screen at the site to the first subtype signal included in the presentation stream signal.

Step 815: Control the relay PAD1 to broadcast, to each PAD, the second switching play request message sent by the PAD3, to instruct each PAD to determine whether to approve the information requested by the second switching play request message.

Step 816: Control the relay PAD1 to send, when the information requested by the second switching play request message that is approved by PADs whose quantity exceeds a set number is received within a set time period, to the VCT a switching instruction for switching the main stream signal currently played on the large screen at the site to the first subtype signal of the presentation stream signal.

Step 817: Control the VCT to send the first subtype signal of the presentation stream signal to the large screen at the site according to the switching instruction sent by the relay PAD1, to instruct the large screen to stop playing the main stream signal, and start to play the first subtype signal of the presentation stream signal.

Embodiment 3

Figure 9A:
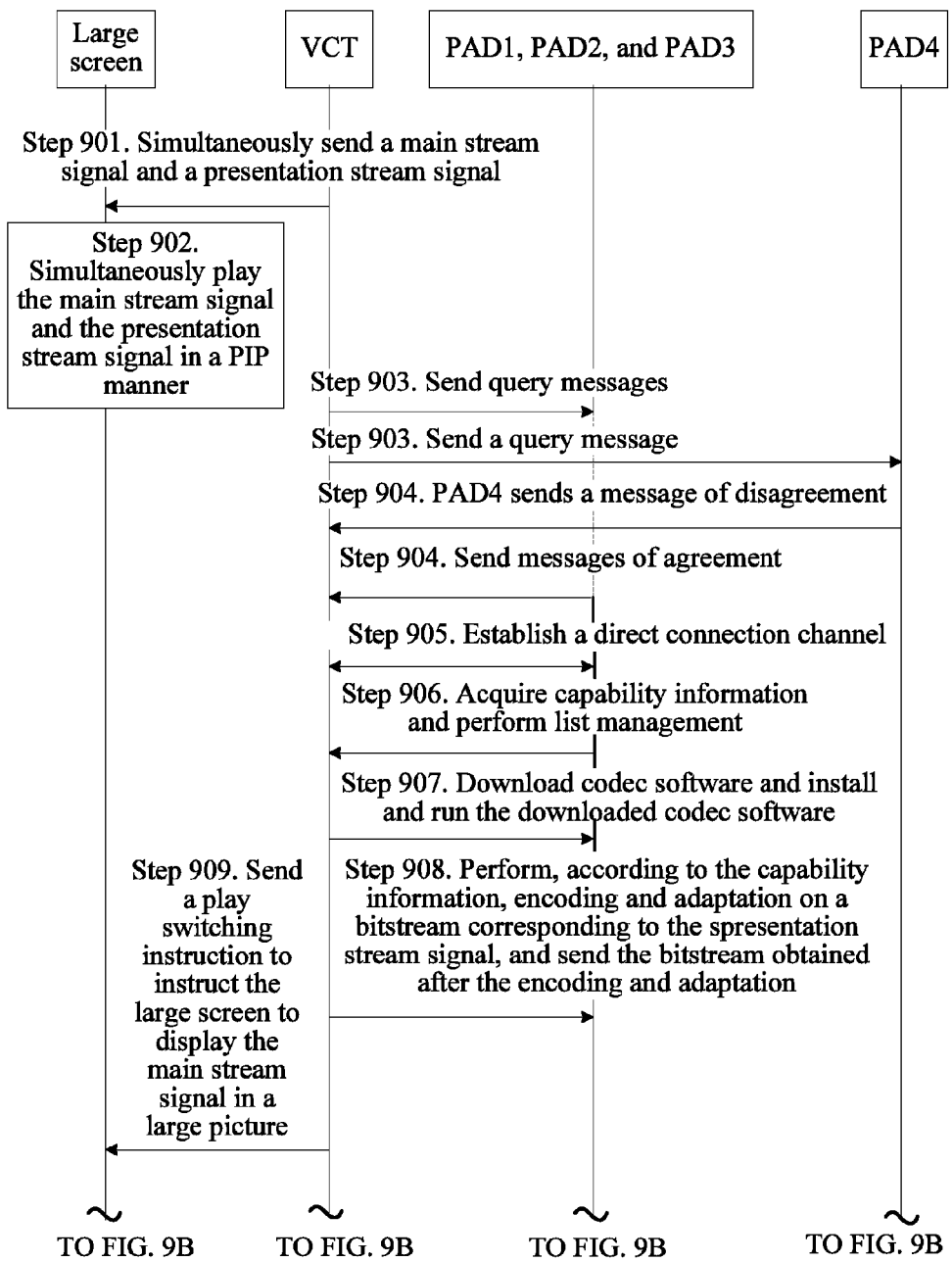
FIG. 9A and FIG. 9B are a detailed schematic flowchart of a method for playing a conference signal according to an embodiment of the present disclosure.
Figure 9B:
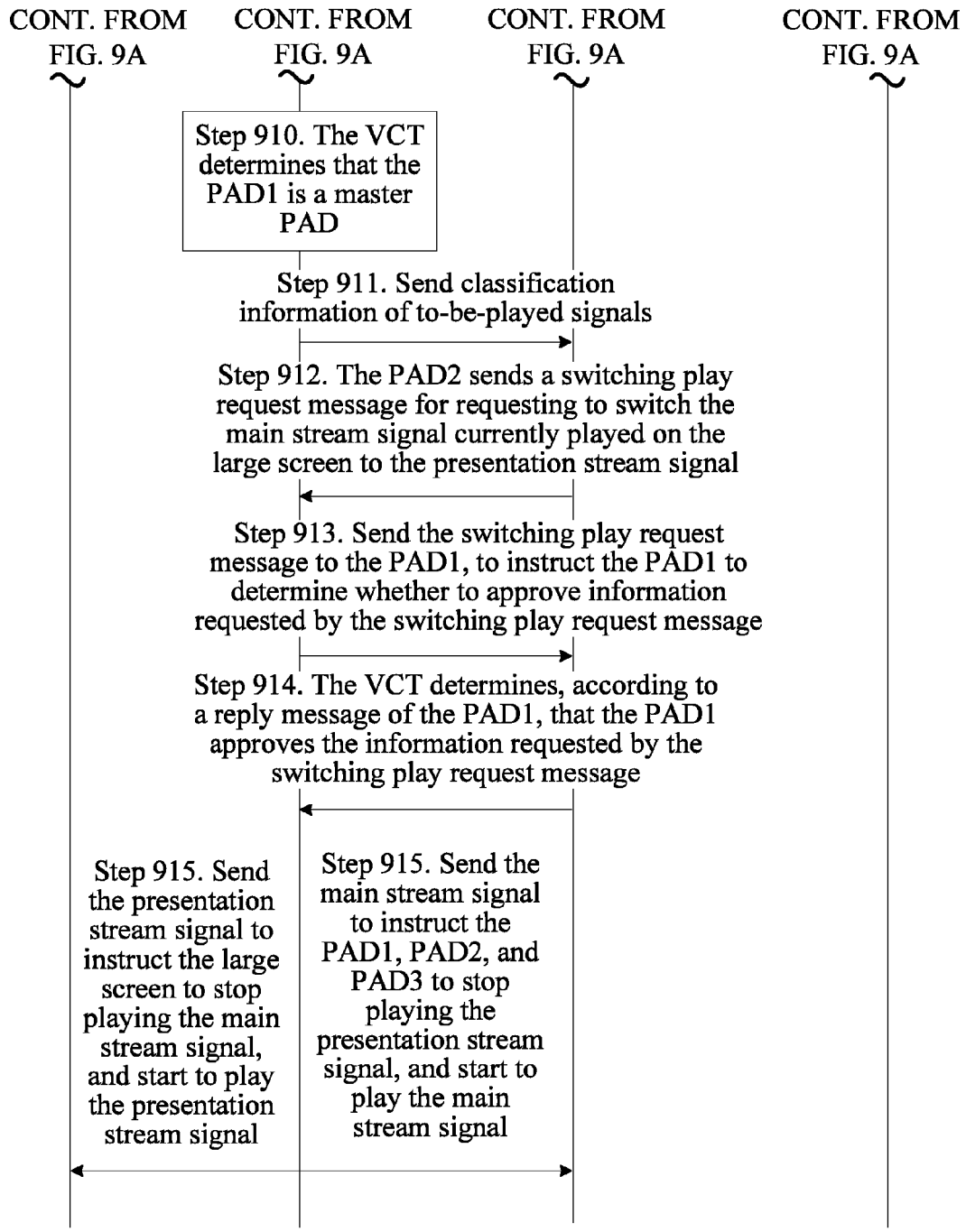

As shown in FIG. 9A and FIG. 9B, a method for playing a conference signal in this embodiment of the present disclosure is introduced using an example in which mobile devices PAD1, PAD2, PAD3, and PAD4 exist at a site, a primary playing device is a large screen at the site, and a direct connection channel between a mobile device held by a conference participant and a VCT at the site is established.

Step 901: A VCT simultaneously sends a main stream signal and a presentation stream signal to a large screen.

Step 902: The large screen simultaneously plays the received main stream signal and the received presentation stream signal in a PIP manner.

Step 903: The VCT sends, to the PAD1, PAD2, PAD3, and PAD4, query messages about whether to agree to establish connections to the VCT.

Step 904: The PAD1, PAD2, and PAD3 send messages of agreement to the VCT, and the PAD4 sends a message of disagreement to the VCT.

Step 905: As shown in FIG. 5A, based on wired IP or wireless IP, the VCT establishes direct connection channels with the PAD1, PAD2, and PAD3.

Step 906: The VCT acquires capability information of the PAD1, PAD2, and PAD3 through the established connection channels, and performs list management on the PAD1, PAD2, and PAD3.

Step 907: The PAD1, PAD2, and PAD3 log in to a web of the VCT to download codec software supported by the PAD1, PAD2, and PAD3, and install and run the downloaded codec software.

Step 908: The VCT performs, according to the capability information of the PAD1, PAD2, and PAD3, encoding and adaptation on a bitstream corresponding to the presentation stream signal, and sends the bitstream obtained after the encoding and adaptation to the PAD1, PAD2, and PAD3.

Step 909: The VCT sends a play switching instruction to the large screen, to instruct the large screen to display the main stream signal in a large picture.

Step 910: The VCT determines that the PAD1 is a master PAD.

Step 911: The VCT sends classification information of to-be-played signals to the PAD1, PAD2, and PAD3.

Step 912: The PAD2 sends, to the VCT according to the classification information of the to-be-played signals, a switching play request message for requesting to switch the main stream signal currently played on the large screen at the site to the presentation stream signal.

Step 913: The VCT receives the switching play request message sent by the PAD2, and sends the switching play request message to the master PAD1, to instruct the master PAD1 to determine whether to approve information requested by the switching play request message.

Step 914: The VCT determines, according to a reply message sent by the master PAD1, that the master PAD1 approves the information requested by the switching play request message.

Step 915: The VCT sends the presentation stream signal to the large screen, to instruct the large screen to stop playing the currently played main stream signal, and start to play the presentation stream signal; and sends, according to the third item of a first switching policy, the main stream signal to the PAD1, PAD2, and PAD3, to instruct the PAD1, PAD2, and PAD3 to stop playing the currently played presentation stream signal, and start to play the main stream signal.

During implementation, an application scenario of the method for playing a conference signal in this embodiment of the present disclosure may be each conference location including a VCT, a mobile device, and/or a primary playing device.

Based on the same inventive concept, this embodiment of the present disclosure further provides an apparatus for playing a conference signal. Because the apparatus for playing a conference signal has a similar principle with the method for playing a conference signal, for implementation of the apparatus, refer to the implementation of the method, and repeated parts are not described again.

Figure 10:
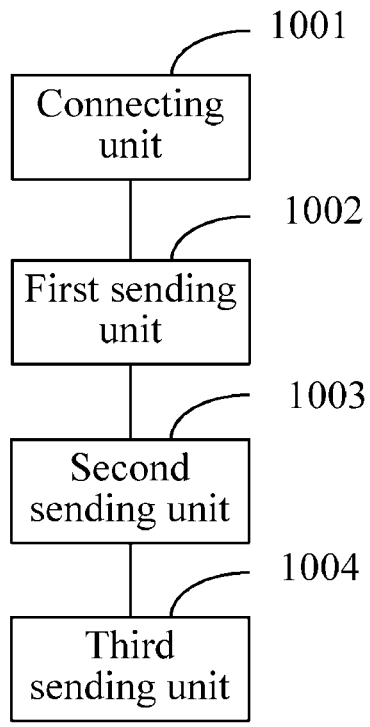
FIG. 10 is a schematic structural diagram of an apparatus for playing a conference signal according to an embodiment of the present disclosure.

FIG. 10 is a schematic structural diagram of an apparatus for playing a conference signal according to an embodiment of the present disclosure. As shown in the figure, the apparatus for playing a conference signal includes a connecting unit 1001 configured to establish a connection channel between a mobile device held by a conference participant and a video conference terminal that are at a site; a first sending unit 1002 configured to send, through the connection channel established by the connecting unit 1001, a first type signal in to-be-played signals to the mobile device for play, where the to-be-played signals are signals that are received by the video conference terminal and are to be played; and a second sending unit 1003 configured to send a second type signal in the to-be-played signals to a primary playing device of the site for play, where in the to-be-played signals, the first type signal is a presentation stream signal, and the second type signal is a main stream signal, or the first type signal is a main stream signal, and the second type signal is a presentation stream signal.

Preferably, the apparatus for playing a conference signal in this embodiment of the present disclosure further includes a third sending unit 1004 configured to, before the first sending unit 1002 sends the first type signal in the to-be-played signals to the mobile device, send classification information of the to-be-played signals to the mobile device, to instruct the mobile device to determine, according to the classification information of the to-be-played signals, a play request message including information about a signal requested to be played by the mobile device.

The first sending unit 1002 is configured to send, to the mobile device according to the play request message received from the mobile device, the first type signal that is in the to-be-played signals and is requested to be played by the mobile device.

Preferably, the first type signal includes different subtype signals. The third sending unit 1004 is further configured to, before the first sending unit 1002 sends the first type signal in the to-be-played signals to the mobile device, send information about the different subtype signals included in the first type signal to the mobile device.

The first sending unit 1002 is further configured to receive information about a subtype signal requested to be played and is sent by the mobile device according to the information about the different subtype signals, and send the subtype signal that is requested to be played by the mobile device and included in the different subtype signals to the mobile device that sends the information about the subtype signal requested to be played for play, or to all mobile devices at the site for play.

Preferably, the first sending unit 1002 is further configured to, after the first sending unit 1002 sends the first type signal in the to-be-played signals to the mobile device, send the second type signal in the to-be-played signals to the mobile device through the established connection channel, to instruct the mobile device to stop playing the currently played first type signal, and start to play the second type signal; and/or the second sending unit 1003 is further configured to, after the second sending unit 1003 sends the second type signal in the to-be-played signals to the primary playing device, send the first type signal in the to-be-played signals to the primary playing device of the site, to instruct the primary playing device to stop playing the currently played second type signal, and start to play the first type signal.

Preferably, the third sending unit 1004 is further configured to, after the first sending unit 1002 sends the first type signal in the to-be-played signals to the mobile device, and after the second sending unit 1003 sends the second type signal in the to-be-played signals to the primary playing device, send the classification information of the to-be-played signals to the mobile device.

The first sending unit 1002 is further configured to receive a switching play request message for requesting to switch the first type signal currently played by the mobile device to the second type signal to be played that is sent by the mobile device according to the classification information of the to-be-played signals; and send, according to the switching play request message, the second type signal in the to-be-played signals to the mobile device through the established connection channel, to instruct the mobile device to stop playing the currently played first type signal, and start to play the second type signal.

The second sending unit 1003 is further configured to receive a switching play request message for requesting to switch the second type signal currently played by the primary playing device to play the first type signal that is sent by the mobile device according to the classification information of the to-be-played signals; and send, according to the switching play request message, the first type signal in the to-be-played signals to the primary playing device of the site, to instruct the primary playing device to stop playing the currently played second type signal, and start to play the first type signal.

Preferably, the first type signal includes different subtype signals. The third sending unit 1004 is further configured to, after the first sending unit 1002 sends the first type signal in the to-be-played signals to the mobile device, and after the second sending unit 1003 sends the second type signal in the to-be-played signals to the primary playing device, send information about the different subtype signals included in the first type signal to the mobile device.

The first sending unit 1002 is further configured to receive information about a subtype signal to which the signal currently played by the mobile device is requested to be switched that is sent by the mobile device according to the information about the different subtype signals; and send the subtype signal that is included in the subtype signals and to which the signal currently played by the mobile device is to be switched, to the mobile device that sends the information about the subtype signal to be switched to as for play, or to all mobile devices at the site for play.

Figure 11:
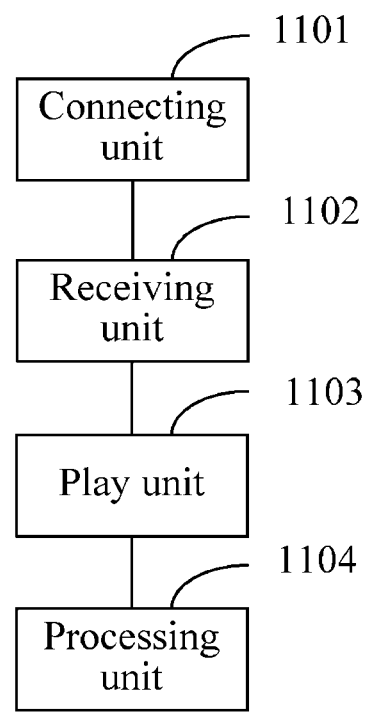
FIG. 11 is a schematic structural diagram of an apparatus for playing a conference signal according to an embodiment of the present disclosure.

FIG. 11 is a schematic structural diagram of an apparatus for playing a conference signal according to an embodiment of the present disclosure. As shown in the figure, the apparatus for playing a conference signal includes a connecting unit 1101 configured to establish a connection channel between a mobile device held by a conference participant and a video conference terminal that are at a site; a receiving unit 1102 configured to receive, through the connection channel established by the connecting unit 1101, a type of signal that is sent by the video conference terminal and selected from to-be-played signals including two different types of signals; and a play unit 1103 configured to play the type of signal received by the receiving unit 1102, where the type of signal is a presentation stream signal or a main stream signal.

Preferably, the apparatus for playing a conference signal in this embodiment of the present disclosure further includes a processing unit 1104 configured to, before the receiving unit 1102 receives the type of signal that is sent by the video conference terminal and selected from the to-be-played signals, receive, through the connection channel established by the connecting unit 1101, classification information of the to-be-played signals that is sent by the video conference terminal, and determine, according to the received classification information, information about a signal requested to be played; and send a play request message including the determined information about the signal to the video conference terminal.

The receiving unit 1102 is configured to receive, through the established connection channel, a type of signal that is selected by the video conference terminal according to the information about the signal included in the play request message, from the to-be-played signals including two different types of signals.

Preferably, the type of signal includes different subtype signals. The processing unit 1104 is further configured to, before the receiving unit 1102 receives the type of signal that is sent by the video conference terminal and selected from the to-be-played signals, receive, through the connection channel, information about the different subtype signals included in the type of signal, where the information is sent by the VCT, and send, to the VCT through the connection channel according to the received information about the different subtype signals included in the type of signal, information about a subtype signal requested to be played.

The receiving unit 1102 is further configured to receive, through the connection channel, the subtype signal selected by the VCT according to the information about the subtype signal requested to be played, from the different subtype signals included in the type of signal in the to-be-played signals including two different types of signals.

A solution for switching a played signal in this embodiment of the present disclosure is introduced below using an example in which to-be-played signals include a first type signal and a second type signal, a signal currently played by a mobile device is the first type signal, and a signal currently played by a primary playing device of a site is the second type signal.

Preferably, the processing unit 1104 is further configured to, after the play unit 1103 plays the received first type signal, receive, through the established connection channel, classification information of the to-be-played signals that is sent by the VCT; send, to the VCT according to the received classification information of the to-be-played signals, a first switching play request message for requesting to switch the first type signal currently played by the mobile device to the second type signal to be played that is included in the to-be-played signals; and/or send, to the VCT, a second switching play request message for requesting to switch the second type signal currently played by the primary playing device of the site to play the first type signal.

The receiving unit 1102 is further configured to receive the second type signal that is sent by the VCT according to the first switching play request message.

The play unit 1103 is further configured to stop playing the currently played first type signal, and start to play the received second type signal.

Preferably, the first type signal includes different subtype signals. The processing unit 1104 is further configured to, after the play unit 1103 plays the received first type signal, receive, through the established connection channel, information about the different subtype signals included in the first type signal, where the information is sent by the VCT, and send, to the VCT through the connection channel according to the information about the different subtype signals included in the received first type signal, information about a subtype signal to which the signal currently played by the play unit 1103 is requested to be switched.

The receiving unit 1102 is further configured to receive, through the connection channel, the subtype signal selected by the VCT according to the information about the subtype signal to which the signal currently played by the mobile device is requested to be switched, from the different subtype signals included in the first type signal.

The play unit 1103 is further configured to play the received subtype signal.

Figure 12:
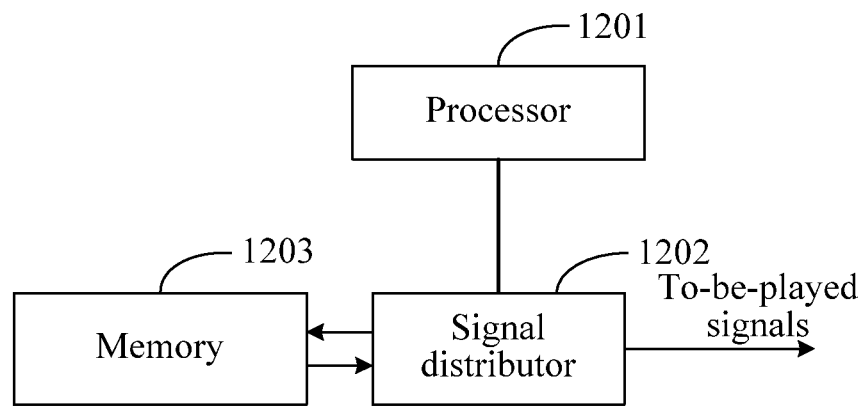
FIG. 12 is a schematic structural diagram of a video conference terminal according to an embodiment of the present disclosure.

FIG. 12 is a schematic structural diagram of a video conference terminal according to an embodiment of the present disclosure. As shown in the figure, the VCT includes a processor 1201 configured to establish a connection channel between a mobile device held by a conference participant and the video conference terminal that are at a site; and a signal distributor 1202 configured to send, through the connection channel established by the processor 1201, a first type signal in to-be-played signals to the mobile device for play, where the to-be-played signals are signals that are received by the video conference terminal and are to be played; and send a second type signal in the to-be-played signals to a primary playing device of the site for play, where in the to-be-played signals, the first type signal is a presentation stream signal, and the second type signal is a main stream signal, or the first type signal is a main stream signal, and the second type signal is a presentation stream signal.

During implementation, the VCT in this embodiment of the present disclosure may further include a memory 1203 configured to store the to-be-played signals.

During implementation, when the signal distributor 1202 needs to send the to-be-played signals, the signal distributor 1202 may acquire the to-be-played signals from the memory 1203.

Preferably, the signal distributor 1202 is further configured to, before sending the first type signal in the to-be-played signals to the mobile device, send classification information of the to-be-played signals to the mobile device, to instruct the mobile device to determine, according to the classification information of the to-be-played signals, a play request message including information about a signal requested to be played by the mobile device; and send, to the mobile device according to the play request message received from the mobile device, the first type signal that is in the to-be-played signals and is requested to be played by the mobile device.

During implementation, the memory 1203 is further configured to store the classification information of the to-be-played signals.

During implementation, when the signal distributor 1202 needs to send the classification information of the to-be-played signals, the signal distributor 1202 may acquire the to-be-played signals from the memory 1203.

Preferably, the first type signal includes different subtype signals. The signal distributor 1202 is further configured to, before sending the first type signal in the to-be-played signals to the mobile device, send information about the different subtype signals included in the first type signal to the mobile device; and receive information about a subtype signal requested to be played that is sent by the mobile device according to the information about the different subtype signals, and send the subtype signal that is requested to be played by the mobile device and included in the different subtype signals to the mobile device that sends the information about the subtype signal requested to be played for play, or to all mobile devices at the site for play.

During implementation, the memory 1203 is further configured to store the information about the different subtype signals included in the first type signal.

During implementation, when the signal distributor 1202 needs to send the information about the different subtype signals included in the first type signal, the signal distributor 1202 may acquire the information from the memory 1203.

Preferably, the signal distributor 1202 is further configured to, after sending the first type signal in the to-be-played signals to the mobile device, send the second type signal in the to-be-played signals to the mobile device through the established connection channel, to instruct the mobile device to stop playing the currently played first type signal, and start to play the second type signal; and/or after sending the second type signal in the to-be-played signals to the primary playing device, send the first type signal in the to-be-played signals to the primary playing device of the site, to instruct the primary playing device to stop playing the currently played second type signal, and start to play the first type signal.

Preferably, the signal distributor 1202 is configured to, after sending the first type signal to the mobile device for play and sending the second type signal to the primary playing device for play, send the classification information of the to-be-played signals to the mobile device; receive a switching play request message for requesting to switch the first type signal currently played by the mobile device to the second type signal to be played that is sent by the mobile device according to the classification information of the to-be-played signals; and send, according to the switching play request message, the second type signal in the to-beplayed signals to the mobile device through the established connection channel, to instruct the mobile device to stop playing the currently played first type signal, and start to play the second type signal; and receive a switching play request message for requesting to switch the second type signal currently played by the primary playing device to play the first type signal that is sent by the mobile device according to the classification information of the to-be-played signals; and send, according to the switching play request message, the first type signal in the to-be-played signals to the primary playing device of the site, to instruct the primary playing device to stop playing the currently played second type signal, and start to play the first type signal.

Preferably, the first type signal includes different subtype signals. The signal distributor 1202 is further configured to, after sending the first type signal to the mobile device for play and sending the second type signal to the primary playing device for play, send information about the different subtype signals included in the first type signal to the mobile device; and receive information about a subtype signal to which the signal currently played by the mobile device is requested to be switched that is sent by the mobile device according to the information about the different subtype signals; and send the subtype signal that is included in the subtype signals and to which the signal currently played by the mobile device is to be switched, to the mobile device that sends the information about the subtype signal to which the signal currently played by the mobile device is requested to be switched for play, or to all mobile devices at the site for play.

Figure 13:
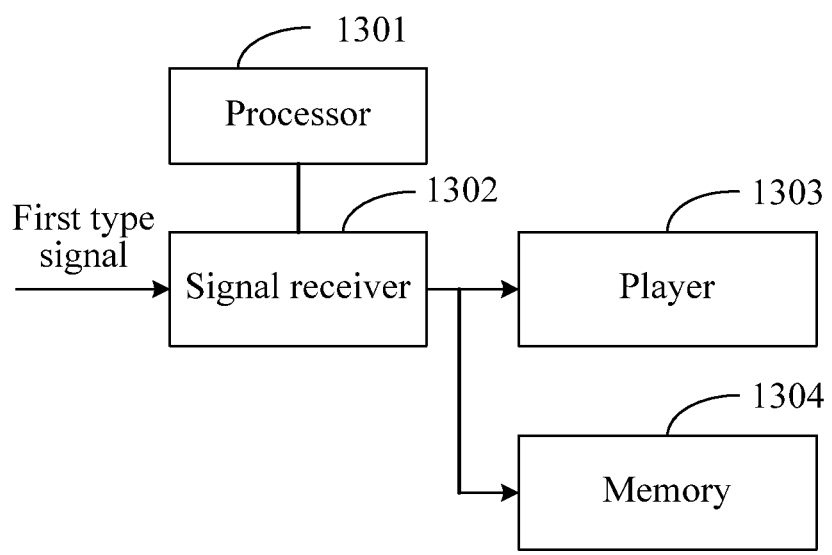
FIG. 13 is a schematic structural diagram of a mobile device according to an embodiment of the present disclosure.

FIG. 13 is a schematic structural diagram of a mobile device according to an embodiment of the present disclosure. As shown in the figure, the mobile device includes a processor 1301 configured to establish a connection channel between the mobile device and a video conference terminal; a signal receiver 1302 configured to receive, through the connection channel established by the processor 1301, a type of signal that is sent by the video conference terminal and selected from to-be-played signals including two different types of signals; and a player 1303 configured to play the received type of signal, where the type of signal is a presentation stream signal or a main stream signal.

During implementation, the mobile device in this embodiment of the present disclosure may further include a memory 1304 configured to store the received type of signal.

Preferably, the processor 1301 is further configured to, before the signal receiver 1302 receives the type of signal that is sent by the video conference terminal and selected from the to-be-played signals, receive, through the established connection channel, classification information of the to-be-played signals that is sent by the video conference terminal, determine, according to the received classification information, information about a signal requested to be played, and send a play request message including the determined information about the signal to the video conference terminal.

The signal receiver 1302 is configured to receive, through the established connection channel, a type of signal that is selected by the video conference terminal according to the information about the signal included in the play request message, from the to-be-played signals including two different types of signals.

During implementation, the memory 1304 is further configured to store the received classification information of the to-be-played signals.

Preferably, the type of signal includes different subtype signals. The processor 1301 is further configured to, before the signal receiver 1302 receives a type of signal that is sent by the video conference terminal and selected from the to-be-played signals, receive, through the connection channel, information about the different subtype signals included in the type of signal, where the information is sent by the VCT, and send, to the VCT through the connection channel according to the received information about the different subtype signals included in the type of signal, information about a subtype signal requested to be played.

The signal receiver 1302 is further configured to receive, through the connection channel, the subtype signal selected by the VCT according to the information about the subtype signal requested to be played, from the different subtype signals included in the type of signal in the to-be-played signals including two different types of signals.

During implementation, the memory 1304 is further configured to store the received information about the different subtype signals included in the type of signal.

A solution for switching a played signal in this embodiment of the present disclosure is introduced below using an example in which to-be-played signals include a first type signal and a second type signal, and a signal played by the player 1303 is the first type signal.

Preferably, the processor 1301 is further configured to, after the player 1303 plays the received first type signal, receive, through the established connection channel, classification information of the to-be-played signals that is sent by the VCT; send, to the VCT according to the received classification information of the to-be-played signals, a first switching play request message for requesting to switch the first type signal currently played by the mobile device to the second type signal to be played that is included in the to-be-played signals; and/or send, to the VCT, a second switching play request message for requesting to switch the second type signal currently played by the primary playing device of the site to play the first type signal.

The signal receiver 1302 is further configured to receive the second type signal that is sent by the VCT according to the first switching play request message.

The player 1303 is further configured to stop playing the currently played first type signal, and start to play the received second type signal.

Preferably, the first type signal includes different subtype signals. The processor 1301 is further configured to, after the player 1303 plays the received first type signal, receive, through the established connection channel, information about the different subtype signals included in the first type signal, where the information is sent by the VCT, and send, to the VCT through the connection channel according to the information about the different subtype signals included in the received first type signal, information about a subtype signal to which a signal currently played by the player 1303 is requested to be switched.

The signal receiver 1302 is further configured to receive, through the connection channel, the subtype signal selected by the VCT according to the information about the subtype signal to which the signal currently played by the mobile device is requested to be switched, from different subtype signals included in the first type signal.

The player 1303 is further configured to play the received subtype signal.

Although some exemplary embodiments of the present disclosure have been described, persons skilled in the art can make changes and modifications to these embodiments once they learn the basic inventive concept. Therefore, the following claims are intended to be construed as covering the exemplary embodiments and all changes and modifications falling within the scope of the present disclosure.

A person skilled in the art can make various modifications and variations to the present disclosure without departing from the spirit and scope of the present disclosure. The present disclosure is intended to cover these modifications and variations provided that these modifications and variations to the present disclosure fall within the scope of protection defined by the following claims of the present disclosure and their equivalent technologies.

What is claimed is:

1. A method for playing a conference signal, comprising:
    establishing a connection channel between a plurality of mobile devices held by a plurality of conference participants located at a site and a video conference terminal located at the site, wherein the video conference terminal comprises a primary playing device;
    sending, through the established connection channel, a first type signal in to-be-played signals to each of the mobile devices for play, wherein the to-be-played signals are signals that are received by the video conference terminal and are to be played; and
    sending a second type signal in the to-be-played signals to the primary playing device of the site for play,
    wherein the first type signal is a presentation stream signal when the second type signal is a main stream signal, or the first type signal is the main stream signal when the second type signal is the presentation stream signal,
    wherein the presentation stream signal comprises at least one of a document and a demonstration slide to be displayed, and
    wherein the main stream signal comprises real-time content to be displayed.

2. The method according to claim 1, wherein before the sending of the first type signal in the to-be-played signals to each of the mobile devices, the method further comprises sending classification information of the to-be-played signals to each of the mobile devices to instruct each of the mobile devices to determine, according to the classification information of the to-be-played signals, a play request message comprising information about a signal requested to be played by each of the mobile devices, and wherein sending of the first type signal in the to-be-played signals to each of the mobile devices comprises sending, to each of the mobile devices according to the play request message received from each of the mobile devices, the first type signal that is in the to-be-played signals and is requested to be played by each of the mobile devices.

3. The method according to claim 1, wherein the first type signal includes a plurality of different subtype signals, and wherein sending the first type signal to each of the mobile devices for play comprises:
    sending a first information about the different subtype signals included in the first type signal to each of the mobile devices;
    receiving a second information about a subtype signal requested to be played that is sent by each of the mobile devices according to the first information about the different subtype signals; and
    sending the subtype signal that is requested to be played by each of the mobile devices and included in the different subtype signals to each the mobile devices that sends the second information about the subtype signal requested to be played for play.

4. The method according to claim 1, wherein the first type signal includes a plurality of different subtype signals, and wherein the sending of the first type signal to each of the mobile devices for play comprises:
    sending a first information about the different subtype signals included in the first type signal to each of the mobile devices;
    receiving a second information about a subtype signal requested to be played that is sent by each of the mobile devices according to the first information about the different subtype signals; and
    sending the subtype signal that is requested to be played by the mobile devices and included in the different subtype signals to each of the mobile devices at the site for play.

5. A method for playing a conference signal implemented by a mobile device, comprising:
    establishing a connection channel between the mobile device held by a conference participant located at a site and a video conference terminal located at the site, wherein the video conference terminal comprises a primary playing device;
    receiving, through the established connection channel, a type of signal that is sent by the video conference terminal, wherein the type of signal is selected from to-be-played signals comprising at least two different types of signals; and
    playing the type of signal selected from the to-be-played signals comprising the at least two different types of signals,
    wherein another type of signal selected from the to-be-played signals comprising the at least two different types of signals is played at the primary playing device,
    wherein the type of signal is a presentation stream signal or a main stream signal,
    wherein the presentation stream signal comprises at least one of a document and a demonstration slide to be displayed, and
    wherein the main stream signal comprises real-time content to be displayed.

6. The method according to claim 5, wherein before receiving the type of signal that is sent by the video conference terminal and selected from the to-be-played signals, the method further comprises:
    receiving, through the established connection channel, classification information of the to-be-played signals that is sent by the video conference terminal;
    determining, according to the received classification information, information about a signal requested to be played; and
    sending a play request message comprising the determined information about the signal to the video conference terminal, and
    wherein receiving the type of signal that is sent by the video conference terminal and selected from the to-be-played signals comprises receiving, through the established connection channel, the type of signal that is selected by the video conference terminal according to the information about the signal comprised in the play request message from the to-be-played signals comprising at least two different types of signals.

7. The method according to claim 5, wherein the type of signal includes a plurality of different subtype signals, and wherein receiving the type of signal sent by the video conference terminal includes:
    receiving, through the connection channel, a first information about the different subtype signals included in the type of signal, wherein the information is sent by the video conference terminal;

sending, to the video conference terminal through the connection channel according to the received first information about the different subtype signals included in the type of signal, a second information about a subtype signal requested to be played; and receiving, through the connection channel, the subtype signal selected by the video conference terminal according to the second information about the subtype signal requested to be played, from the different subtype signals included in the type of signal in the to-be-played signals.

8. A video conference terminal, comprising:
a processor configured to establish a connection channel between a plurality of mobile devices held by a plurality of conference participants located at a site and the video conference terminal located at the site; and
a signal distributor configured to:
send, through the connection channel established by the processor, a first type signal in to-be-played signals to each of the mobile devices for play, wherein the to-be-played signals are signals that are received by the video conference terminal and are to be played; and
send a second type signal in the to-be-played signals to a primary playing device of the site for play,
wherein the first type signal is a presentation stream signal when the second type signal is a main stream signal, or the first type signal is the main stream signal when the second type signal is the presentation stream signal,
wherein the presentation stream signal comprises at least one of a document and a demonstration slide to be displayed, and
wherein the main stream signal comprises real-time content to be displayed.

9. The video conference terminal according to claim 8, wherein, before sending the first type signal in the to-be-played signals to each of the mobile devices, the signal distributor is further configured to:
send classification information of the to-be-played signals to each of the mobile devices, to instruct each of the mobile devices to determine, according to the classification information of the to-be-played signals, a play request message comprising information about a signal requested to be played by each of the mobile devices; and
send, to each of the mobile devices according to the play request message received from each of the mobile devices, the first type signal that is in the to-be-played signals and is requested to be played by each of the mobile devices.

10. The video conference terminal according to claim 8, wherein the first type signal includes a plurality of different subtype signals and wherein the signal distributor is further configured to:
send a first information about the different subtype signals included in the first type signal to each of the mobile devices;
receive a second information about a subtype signal requested to be played that is sent by each of the mobile devices according to the first information about the different subtype signals; and
send the subtype signal that is requested to be played by each of the mobile devices and included in the subtype signals to each of the mobile devices that sends the second information about the subtype signal requested to be played for play.

11. The video conference terminal according to claim 8, wherein the first type signal includes a plurality of different subtype signals and wherein the signal distributor is further configured to:
send a first information about the different subtype signals included in the first type signal to each of the mobile devices;
receive a second information about a subtype signal requested to be played that is sent by each of the mobile devices according to the first information about the different subtype signals; and
send the subtype signal that is requested to be played by each of the mobile devices and included in the subtype signals to each of the mobile devices at the site for play.

12. A mobile device, comprising:
a processor configured to establish a connection channel between the mobile device located at a site and a video conference terminal located at the site, wherein the video conference terminal comprises a primary playing device;
a signal receiver configured to receive, through the connection channel established by the processor, a type of signal that is sent by the video conference terminal, wherein the type of signal is selected from to-be-played signals comprising at least two different types of signals; and
a player configured to play the type of signal selected from the to-be-played signals comprising the at least two different types of signals,
wherein another type of signal selected from the to-be-played signals comprising the at least two different types of signals is played at the primary playing device,
wherein the type of signal is a presentation stream signal or a main stream signal,
wherein the presentation stream signal comprises at least one of a document and a demonstration slide to be displayed, and
wherein the main stream signal comprises real-time content to be displayed.

13. The mobile device according to claim 12, wherein the signal receiver is further configured to receive, through the established connection channel, classification information of the to-be-played signals that is sent by the video conference terminal, wherein the processor is further configured to determine, according to the received classification information, information about a signal requested to be played, wherein the mobile device further comprises a signal transmitter coupled to the processor and configured to send a play request message comprising the classification information about the signal to the video conference terminal, and wherein the signal receiver is configured to receive, through the established connection channel, the type of signal that is selected by the video conference terminal according to the information about the signal comprised in the play request message, from the to-be-played signals comprising the at least two different types of signals.

14. The mobile device according to claim 12, wherein the type of signal includes a plurality of different subtype signals, and wherein the signal receiver is further configured to receive, through the connection channel, a first information about the different subtype signals included in the type of signal, where the first information is sent by the video conference terminal, wherein the mobile device further comprises a transmitter coupled to the processor and configured to send, to the video conference terminal through the connection channel according to the first information about the different subtype signals included in the type of signal, a second information about a subtype signal requested to be played, and wherein the signal receiver is configured to receive, through the connection channel, the subtype signal selected by the video conference terminal according to the second information about the subtype signal requested to be played, from the different subtype signals included in the type of signal in the to-be-played signals.

15. The method according to claim 1, wherein the first type signal is the presentation stream signal, and wherein the second type signal is the main stream signal.

16. The method according to claim 1, wherein the presentation stream signal comprises a plurality of first subtype signals, wherein the first subtype signals comprise at least one of the document and the demonstration slide that is shared by another site, wherein the main stream signal comprises a plurality of second subtype signals, and wherein the second subtype signals comprise at least one of an image signal collected in real-time or a speech signal collected in real-time.

17. The method according to claim 5, wherein the connection between the mobile device and the video conference terminal is a direct connection.

18. The method according to claim 5, wherein the connection between the mobile device and the video conference terminal is an indirect connection.

19. The video conference terminal according to claim 8, wherein the processor is further configured to:
  determine a master mobile device according to capability information of a plurality of mobile devices held by a plurality of conference participants at the site; and
  control a switching of signals played by the primary playing device and the mobile devices according to a selection received from the master mobile device.

20. The mobile device according to claim 12, wherein the processor is further configured to send a switching play request message to switch a signal played by a primary playing device and the mobile device.

* * * * *

UNITED STATES PATENT AND TRADEMARK OFFICE
CERTIFICATE OF CORRECTION

| | | |
|---|---|---|
| PATENT NO. | : 9,521,366 B2 | |
| APPLICATION NO. | : 14/946171 | |
| DATED | : December 13, 2016 | |
| INVENTOR(S) | : Wu et al. | |

It is certified that error appears in the above-identified patent and that said Letters Patent is hereby corrected as shown below:

In the Claims

Column 30, Line 11, Claim 4 should read:
sending the subtype signal that is requested to be played by each of the mobile devices and included in the different subtype signals to each of the mobile devices at the site for play.

Signed and Sealed this
Twenty-eighth Day of March, 2017

Michelle K. Lee
*Director of the United States Patent and Trademark Office*